United States Patent
Araki et al.

(10) Patent No.: US 9,340,032 B2
(45) Date of Patent: May 17, 2016

(54) LIQUID EJECTION DEVICE AND LIQUID LEAKAGE SUPPRESSION METHOD

(71) Applicant: CANON KABUSHIKI KAISHA, Tokyo (JP)

(72) Inventors: Yoshimasa Araki, Utsunomiya (JP); Yasuyuki Tamura, Yokohama (JP); Akio Saito, Machida (JP); Makoto Fukuhara, Kamakura (JP); Hiroyuki Ozaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/496,111

(22) Filed: Sep. 25, 2014

(65) Prior Publication Data

US 2015/0097900 A1   Apr. 9, 2015

(30) Foreign Application Priority Data

Oct. 4, 2013 (JP) ................................. 2013-208957
Sep. 17, 2014 (JP) ................................. 2014-188444

(51) Int. Cl.
*B41J 2/175* (2006.01)
*B41J 2/20* (2006.01)
(Continued)

(52) U.S. Cl.
CPC . *B41J 2/20* (2013.01); *B29C 59/16* (2013.01); *B41J 2/175* (2013.01); *B29L 2031/7678* (2013.01); *Y10T 137/0396* (2015.04)

(58) Field of Classification Search
CPC ............. B41J 2/17566; B41J 2/17513; B41J 2/17546; B41J 2/1752; B41J 2/175; B41J 2/17526; B41J 19/202; B41J 2/1755; B41J 2/17503; B41J 2/125; B41J 2/17543

USPC .......................... 347/7, 14, 19, 30, 40, 84–86
See application file for complete search history.

(56) References Cited

U.S. PATENT DOCUMENTS 6,540,314 B1 * 4/2003 Sanada .................. B41J 2/1752
                                                                 347/7
6,991,315 B2 * 1/2006 Nakamura et al. ............. 347/40
(Continued)

FOREIGN PATENT DOCUMENTS

CN       1422747 A    6/2003
CN     101098789 A    1/2008
(Continued)

OTHER PUBLICATIONS

Office Action in Chinese Patent Application No. 201410509793.X, dated Oct. 8, 2015.

*Primary Examiner* — Thinh Nguyen
(74) *Attorney, Agent, or Firm* — Fitzpatrick, Cella, Harper & Scinto

(57) ABSTRACT

There is provided a liquid ejection device including a head for ejecting a liquid, a liquid containing unit, a liquid filler, and a pressure adjusting unit, in which the liquid containing unit includes a sealed housing and a flexible member provided in the housing, the housing includes a first containing space communicating with the head and a second containing space partitioned from the first containing space through use of the flexible member, the first containing space contains the liquid, and the liquid filler is filled into the second containing space, the pressure adjusting unit communicates with the second containing space, and adjusts the pressure of the liquid filler filled into the second containing space so as to maintain a negative pressure with respect to the head.

60 Claims, 17 Drawing Sheets

(51) Int. Cl.
*B29C 59/16* (2006.01)
*B29L 31/00* (2006.01)

(56) References Cited

U.S. PATENT DOCUMENTS 7,455,389 B2    11/2008  Nakamura et al.
8,827,403 B2 *   9/2014  Miyamoto et al. ............. 347/14
2003/0067518 A1  4/2003  Ishinaga et al.
2009/0122093 A1  5/2009  Mutoh
2013/0100191 A1  4/2013  Miyamoto et al.

FOREIGN PATENT DOCUMENTS

JP   2006-192785 A   7/2006
JP   2008-105360 A   5/2008

* cited by examiner

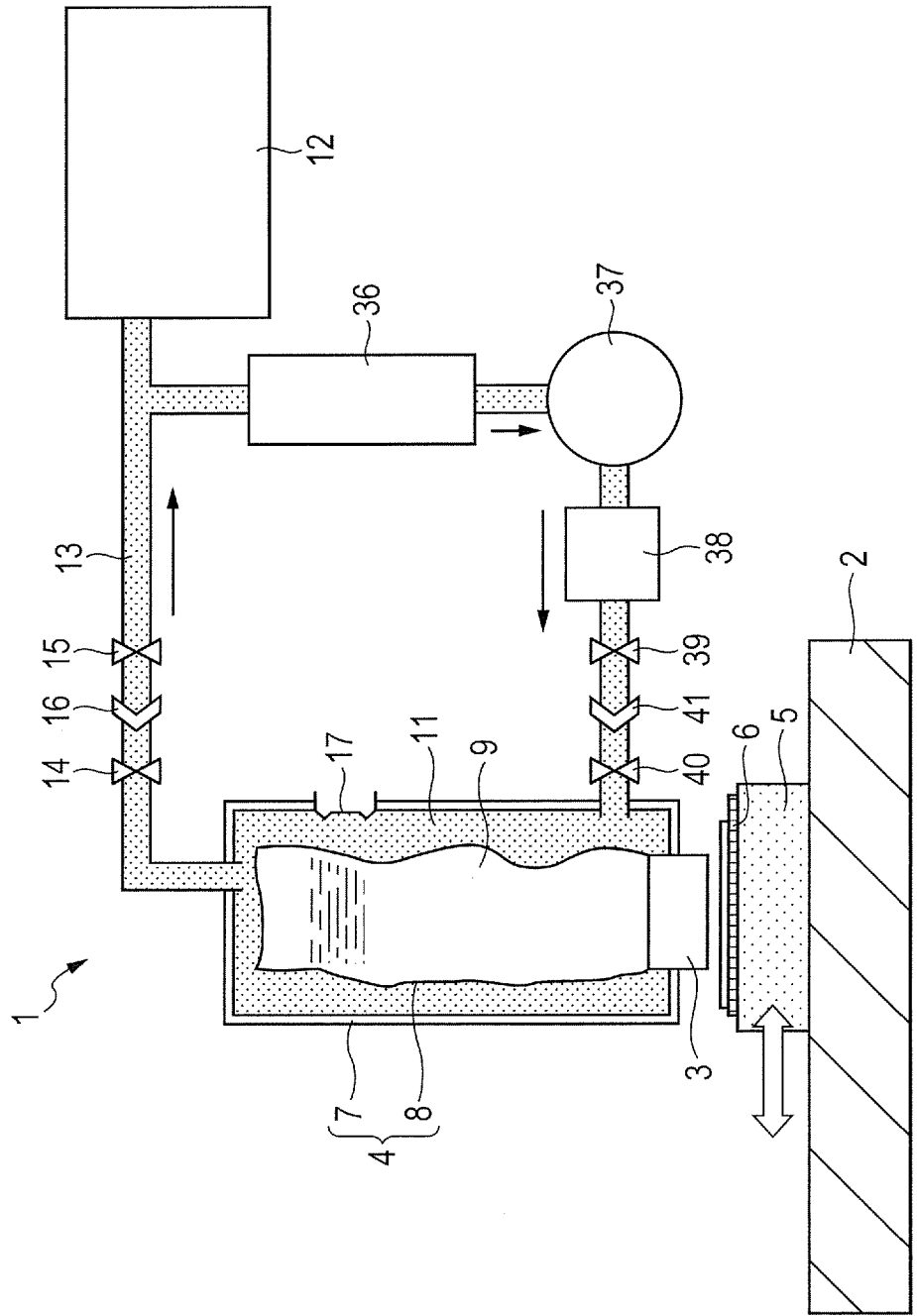

LIQUID EJECTION DEVICE AND LIQUID LEAKAGE SUPPRESSION METHOD

BACKGROUND OF THE INVENTION

1. Field of the Invention

The present invention relates to a liquid ejection device including a liquid ejection head for ejecting a liquid and a method of suppressing the leakage of a liquid from the liquid ejection head.

2. Description of the Related Art

A liquid ejection device including a liquid ejection head (hereinafter simply referred to as "head") has been known. In recent years, the liquid ejection device has been used in various fields, for example, in an inkjet recording device.

In the liquid ejection device including the head, when the pressure of a liquid in the head increases, the liquid leaks from an orifice of the head. The liquid leaking from the head may adversely affect a main body of the liquid ejection device. For this reason, it is required to maintain the internal pressure of the head to be a negative pressure.

In Japanese Patent Application Laid-Open No. 2006-192785, there is disclosed a liquid ejection device including a sealed housing (also referred to as "containing portion") and an ink tank provided in the housing. The inside of the ink tank forms a first containing space for containing a liquid, and air is sealed in a second containing space formed between an outer side surface of the ink tank and an inner side surface of the housing.

Further, the head communicates with the ink tank so that the liquid contained in the ink tank is supplied to the head. The ink tank is a bag-shaped container having flexibility, and the volume of the containing bag changes along with the ejection of the liquid.

In addition, the liquid ejection device further includes a regulator for adjusting the pressure of gas in the second containing space, and the pressure of the liquid contained in the ink tank is adjusted when the regulator adjusts the pressure of the gas. As a result, the internal pressure of the head is maintained to be a negative pressure.

In Japanese Patent Application Laid-Open No. 2008-105360, there is disclosed a liquid ejection device including an ink tank and a housing. Further, a float filled with gas is provided between an outer side surface of the ink tank and an inner side surface of the housing, and a region therebetween is filled with a liquid filler for floating the float.

Specifically, the ink tank is fixed to a bottom wall of the housing, and the float is fixed to an upper part of the ink tank. The float is positioned in the liquid filler, and a buoyant force is generated in the float.

In the liquid ejection device, the ink tank is biased in a direction of enlarging the capacity of the ink tank by virtue of the buoyant force generated in the float. When the biasing force acts on the ink tank, the internal pressure of each of the ink tank and the head is maintained to be a negative pressure.

However, the liquid ejection device disclosed in Japanese Patent Application Laid-Open No. 2006-192785 has the following problems.

Specifically, the volume of air is liable to vary along with a change in temperature or pressure. The gas is sealed in the second containing space, and hence the volume of the gas sealed in the second containing space varies along with a change in temperature or atmospheric pressure on the periphery of the liquid ejection device. As a result, the pressure of the liquid in the ink tank may vary.

Further, the flexible member forming the ink tank is made of a material which is not capable of preventing the permeation of gas completely. Therefore, the gas sealed in the second containing space enters the ink tank to generate air bubbles in the liquid contained in the ink tank. The generation of the air bubbles in the liquid increases the pressure of the liquid.

Further, the first containing space is filled with the liquid and the second containing space is filled with the gas, and the difference in density between the liquid and the gas is relatively large. Therefore, the ink tank is rocked relatively greatly when an impact is applied to the housing. When the ink tank is rocked, the pressure of the liquid in the ink tank varies.

As described above, in the liquid ejection device, the pressure of the liquid contained in the ink tank is liable to vary. Therefore, it is difficult to maintain the internal pressure of the head to be a negative pressure, and there has been a risk in that the liquid may leak from the head.

On the other hand, in the liquid ejection device disclosed in Japanese Patent Application Laid-Open No. 2008-105360, the float filled with the gas is required to be sunk in the liquid filler. The difference in density between the gas and the liquid filler is relatively large, and hence the float is rocked relatively greatly when an impact is applied to the housing. The containing bag is rocked along with the rocking of the float, and the pressure of the liquid in the containing bag varies. As a result, the pressure of the liquid in the head varies, and there has been a risk in that the liquid may leak from the head.

SUMMARY OF THE INVENTION

It is an object of the present invention to further suppress the leakage of a liquid from a head.

According to one embodiment of the present invention, there is provided a liquid ejection device, including: a head configured to eject a liquid; a liquid containing unit including a sealed housing and a flexible member provided in the sealed housing, the sealed housing including a first containing space communicating with the head and a second containing space partitioned from the first containing space through use of the flexible member, the first containing space containing the liquid; a liquid filler filled into the second containing space; and a pressure adjusting unit configured to adjust a pressure of the liquid filler filled into the second containing space so as to maintain a negative pressure with respect to the head, the pressure adjusting unit communicating with the second containing space.

Further, according to one embodiment of the present invention, there is provided a liquid leakage suppression method for a liquid ejection device including a head configured to eject a liquid, a sealed housing, and a flexible member provided in the sealed housing, the sealed housing including a first containing space communicating with the head and a second containing space partitioned from the first containing space through use of the flexible member, the liquid being contained in the first containing space, the liquid leakage suppression method including: filling a liquid filler into the second containing space; and adjusting a pressure of the liquid filler filled into the second containing space so as to maintain a negative pressure with respect to the head.

Further features of the present invention will become apparent from the following description of exemplary embodiments with reference to the attached drawings.

BRIEF DESCRIPTION OF THE DRAWINGS

FIG. 16 is a schematic view of a liquid ejection device according to a tenth embodiment of the present invention.

DESCRIPTION OF THE EMBODIMENTS

Now, embodiments of the present invention are described with reference to the drawings.

(First Embodiment)

A first embodiment of the present invention is described with reference to FIGS. 1 to 4.

Figure 1:
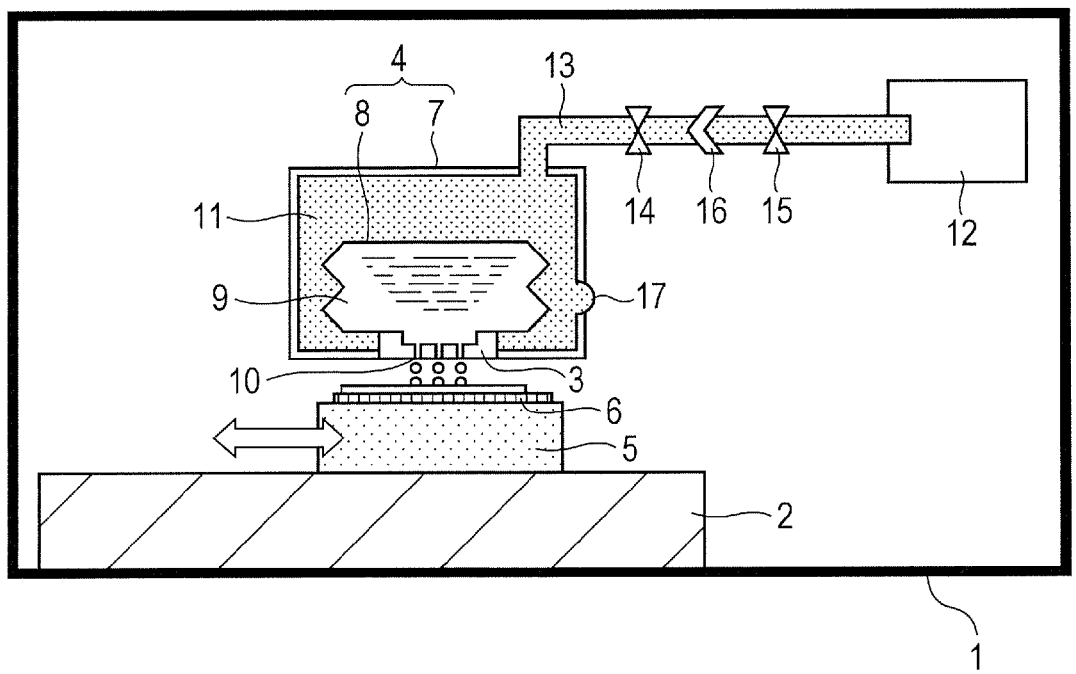
FIG. 1 is a schematic view of a liquid ejection device according to a first embodiment of the present invention.

FIG. 1 is a schematic view of a liquid ejection device according to this embodiment. The liquid ejection device illustrated in FIG. 1 is an inkjet device which ejects ink.

As illustrated in FIG. 1, a liquid ejection device 1 includes a base plate 2, a head 3, and a liquid containing unit 4. A conveyance portion 5 is mounted on the base plate 2. An object 6 to be printed is attracted onto the conveyance portion 5 through use of an attraction unit (not shown).

The liquid containing unit 4 includes a sealed housing 7 and a flexible containing bag 8 provided in the housing 7. The housing 7 includes a first containing space communicating with the head 3 and a second containing space partitioned from the first containing space through use of the flexible containing bag 8. The second containing space does not communicate with the head 3.

In this embodiment, the inner space of the containing bag 8 forms the first containing space, and the space between the outer side surface of the containing bag 8 and the housing 7 forms the second containing space.

Note that, the present invention is not limited to the configuration in which the first containing space and the second containing space are partitioned from each other through use of the containing bag 8, and it is only necessary that the first containing space and the second containing space be partitioned from each other through use of a flexible member.

A liquid 9 such as ink is contained in the first containing space, that is, the containing bag 8. The liquid 9 contained in the containing bag 8 is supplied to the head 3 and ejected downward from an orifice 10 of the head 3. As the liquid 9, a liquid such as a conductive liquid or a UV-curable liquid can also be used, and it is desired that the liquid 9 be subjected to deaeration.

The containing bag 8 is directly connected to the head 3 without using a tube or a valve. A sliding member such as a valve is not used between the containing bag 8 and the head 3, and hence the mixing of minute dust with the liquid 9 is suppressed.

The liquid ejection device 1 further includes a liquid filler 11 to be filled into the second containing space and a pressure adjusting unit 12 for adjusting the pressure of the liquid filler 11 filled into the second containing space. The liquid filler 11 is an incompressible substance, and for example, a liquid such as water or a gel-like substance can be used as the liquid filler 11.

The second containing space, that is, the space filled with the liquid filler 11 is connected to the pressure adjusting unit 12 through a communication unit 13 such as a tube. The communication unit 13 is provided with valves 14 and 15, and a joint 16 is disposed between the valves 14 and 15.

In this embodiment, the liquid filler 11 is filled into the second containing space. The volume of a liquid or a gel is less influenced by a change in temperature and pressure, compared to the volume of gas. Thus, even when the temperature or atmospheric pressure on the periphery of the liquid ejection device 1 changes, the volume of the liquid filler 11 hardly varies, and the variation in pressure of the liquid 9 in the first containing space can be suppressed.

Part of the housing 7 may be formed as a buffer 17. Specifically, the buffer 17 is formed by forming part of the wall of the housing 7 as a flexible film. The buffer 17 functions in the case where the operation of the liquid ejection device 1 is stopped or in the case where a power source is interrupted during the operation of the liquid ejection device 1.

For example, the volume of the liquid filler 11 and the liquid 9 changes slightly along with a change in atmospheric pressure and temperature. The buffer 17 absorbs the variation in pressure occurring due to a change in volume of the liquid filler 11 and the liquid 9, and hence the variation in pressure of the liquid 9 in the first containing space is suppressed to be smaller.

The volume of the liquid filler 11 is less influenced by a change in temperature or atmospheric pressure, compared to the volume of gas. Therefore, the present invention has an advantage in that the buffer 17 can be further downsized compared to the case where gas is filled into the second containing space. Note that, the present invention is not limited to the configuration in which the buffer 17 is provided to the housing 17, and the buffer 17 may be provided to the communication unit 13.

Further, in this embodiment, the liquid 9 is contained in the containing bag 8, and the liquid filler 11 is filled into the space between the outer side surface of the containing bag 8 and the housing 7, and hence the containing bag 8 is hardly exposed to gas. Thus, gas hardly enters the containing bag 8, and the increase in pressure of the liquid 9 contained in the containing bag 8 is thus suppressed.

As the flexible member forming the containing bag 8, for example, a material having small gas permeability such as an aluminum multi-layered film can be used. When the material having small gas permeability is used, even in the case where air bubbles are generated in the liquid filler 11, the permeation of the air bubbles into the containing bag 8 is suppressed, and the increase in pressure of the liquid 9 in the containing bag 8 can thus be suppressed.

Further, the liquid 9 is contained in the first containing space and the liquid filler 11 is filled into the second containing space, and the difference in density between the liquid 9 and the liquid filler 11 is smaller than that between the liquid 9 and the gas. The rocking of the containing bag 8 when an impact is applied to the housing 7 can further be suppressed by reducing the difference in density between the substance to be contained in the first containing space and the substance to be filled into the second containing space.

For example, in the case where gas is filled into the second containing space, the density of the gas is negligibly small with respect to the density of the liquid 9. In such a case, the gas moves in the housing 7 in accordance with the movement of the containing bag 8 containing the liquid 9. Thus, when an impact is applied to the housing 7, the gas hardly suppresses the movement of the containing bag 8, and the containing bag 8 is rocked relatively greatly.

In this embodiment, the liquid filler 11 having a relatively small density difference with respect to the liquid 9 contained in the first containing space is filled into the second containing space. Thus, the liquid filler 11 moves in the housing 7 independently from the movement of the containing bag 8 containing the liquid 9. That is, when an impact is applied to the housing 7, the liquid filler 11 and the containing bag 8 containing the liquid 9 suppress the respective movements with each other, with the result that the rocking of the containing bag 8 is suppressed.

It is preferred that the liquid filler 11 have a density falling within a range of from 80% or more to 120% or less with respect to the density of the liquid 9. The rocking of the containing bag 8 is suppressed more effectively through use of the liquid filler 11 having a density falling within this range.

In the case where gas is filled into the second containing space, the density difference between the liquid contained in the first containing space and the gas filled into the second containing space is considered to be 100%. In contrast, the density difference falls within 20% by using the liquid filler 11 having a density falling within a range of from 80% or more to 120% or less with respect to the density of the liquid 9. As a result, compared to the case where the gas is filled into the second containing space, the rocking of the containing bag 8 can be suppressed to one-fifth or less. As the density difference between the liquid filler 11 and the liquid 9 becomes smaller, the containing bag 8 becomes less likely to be rocked.

In addition, in this embodiment, the pressure adjusting unit 12 adjusts the pressure of the liquid filler 11 filled into the second containing space, and hence it is not necessary that a float on which a buoyant force acts in the liquid filler 11 be provided in the containing bag 8. Thus, the variation of a distribution of the density in the housing 7 can be reduced, and the rocking of the containing bag 8 when an impact is applied to the housing 7 can be suppressed.

When the rocking of the containing bag 8 is suppressed, the variation in pressure of the liquid 9 contained in the containing bag 8 is suppressed.

As described above, in this embodiment, the variation in pressure of the liquid 9 contained in the first containing space, that is, the containing bag 8 is suppressed. Thus, the variation in pressure of the liquid 9 in the head 3 is suppressed, and the internal pressure of the head 3 is maintained to be a negative pressure. As a result, the leakage of the liquid 9 (liquid leakage) from the head 3 is suppressed.

As an example of this embodiment, the capacity of the housing 7, the initial amount of the liquid 9, and the initial amount of the liquid filler 11 can be set to 400 ml, about 300 ml, and about 100 ml, respectively. Needless to say, the present invention is not limited thereto, and the capacity of the housing 7, the initial amount of the liquid 9, and the initial amount of the liquid filler 11 can be determined appropriately. For example, the capacity of the housing 7 and the initial amount of the liquid 9 may be set to 400 ml and about 400 ml, respectively, and in the initial stage, the liquid filler 11 may not be filled into the second containing space.

The flexible member forming the containing bag 8 is a member having a thickness of from about 10 μm to about 200 μm, which is assumed to be at most from about 5 ml to about 6 ml in terms of volume. Thus, the volume of the flexible member forming the containing bag 8 is about 1% with respect to the total amount of the liquid filler 11 and the liquid 9, which is sufficiently small. Therefore, the density difference between the flexible member forming the containing bag 8 and the liquid filler 11, and the density difference between the flexible member forming the containing bag 8 and the liquid 9 are negligible.

For example, as the member to be used for the containing bag 8, there is given an aluminum laminate film having relatively high airtightness. The film thickness of the laminate film is generally about 10 μm. The density of aluminum is 2.7 g/cm$^3$, which is considerably higher than the density of the liquid filler 11 and the liquid 9. However, the volume ratio of the containing bag 8 with respect to the total amount of the liquid filler 11 and the liquid 9 is less than 1%, and the density of the containing bag 8 is negligible.

The housing 7 is filled with the liquid 9 and the liquid filler 11, and hence the rocking of the containing bag 8 can be suppressed. As a result, the leakage of the liquid 9 from the orifice 10 is suppressed.

In the state in which the liquid containing unit 4 is mounted on the liquid ejection device 1, the housing 7 is rocked relatively greatly when an external force is applied to the communication unit 13 in some cases. Further, the liquid containing unit 4 moves in the liquid ejection device 1 in some cases. Even in such cases, the rocking of the containing bag 8 is suppressed, and hence the leakage of the liquid 9 from the head 3 is suppressed.

Figure 2:
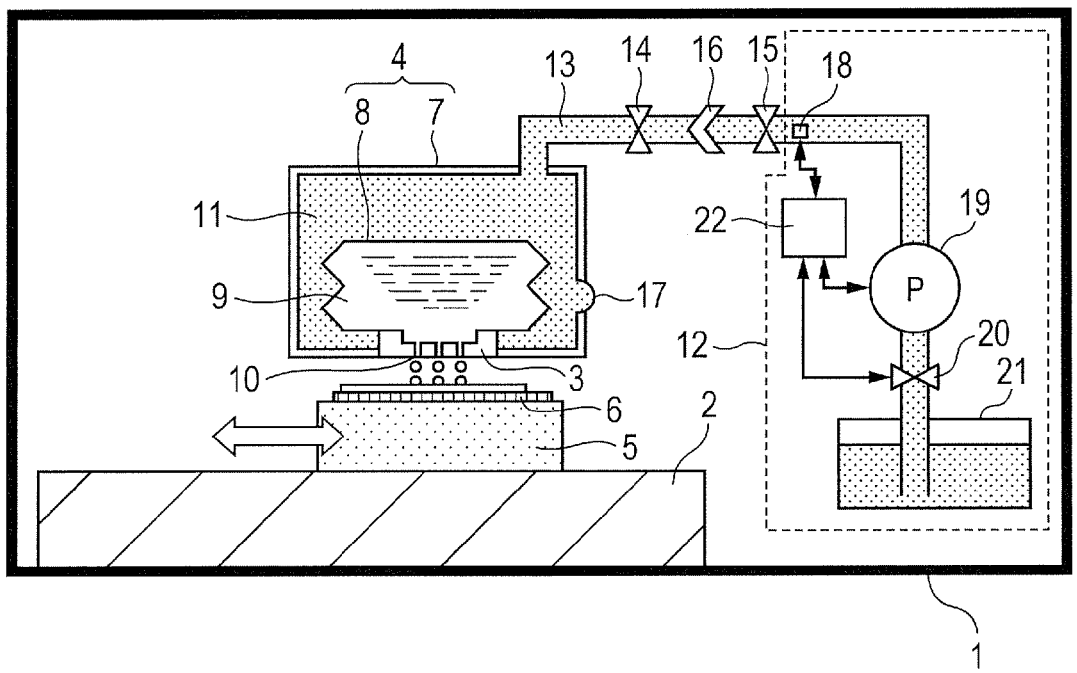
FIG. 2 is a view illustrating an example of a pressure adjusting unit illustrated in FIG. 1.

FIG. 2 is a view illustrating an example of the pressure adjusting unit 12. As illustrated in FIG. 2, the pressure adjusting unit 12 may include a pressure sensor 18, a pump 19, a valve 20, a storage tank 21, and a control unit 22.

The pressure sensor 18 serves as a pressure measuring unit for measuring the pressure of the liquid filler 11 in the communication unit 13. The pressure to be measured with the pressure sensor 18 corresponds to a relative pressure of the liquid filler 11 with respect to the atmospheric pressure in the liquid ejection device 1. It is desired that the pressure sensor 18 be disposed at a position closer to the valve 15 so as not to be influenced easily by the external disturbance.

The storage tank 21 stores the liquid filler 11. The pump 19 moves the liquid filler 11 between the storage tank 21 and the housing 7. Examples of the pump 19 include a tube pump, a diaphragm pump, and a gear pump. The valve 20 is disposed between the pump 19 and the storage tank 21 and is usually closed.

The pressure sensor 18 measures the pressure of the liquid filler 11 and transmits a signal corresponding to the pressure to the control unit 22. The control unit 22 controls the operation of the valve 20 and the pump 19 based on the pressure of the liquid filler 11 in the communication unit 13. When the pump 19 is driven in a state in which the valve 20 is opened, the liquid filler 11 moves between the storage tank 21 and the housing 7, and the pressure of the housing 7 is adjusted to a predetermined value.

Figure 3:
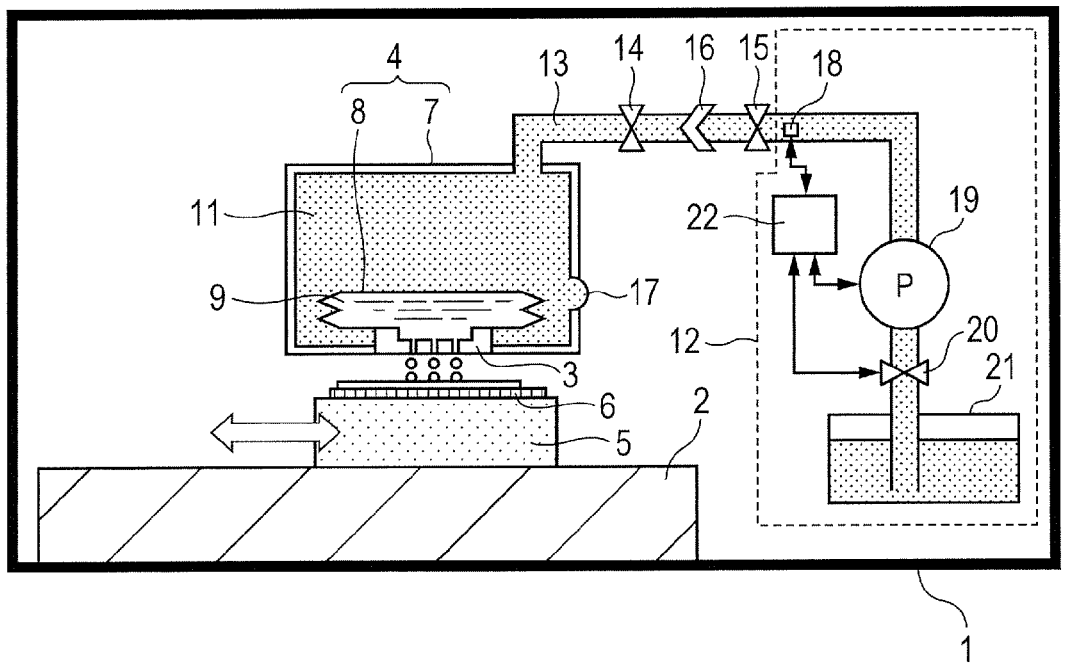
FIG. 3 is a view illustrating a state in which a flexible containing bag has contracted from the state illustrated in FIG. 2.
Figure 4:
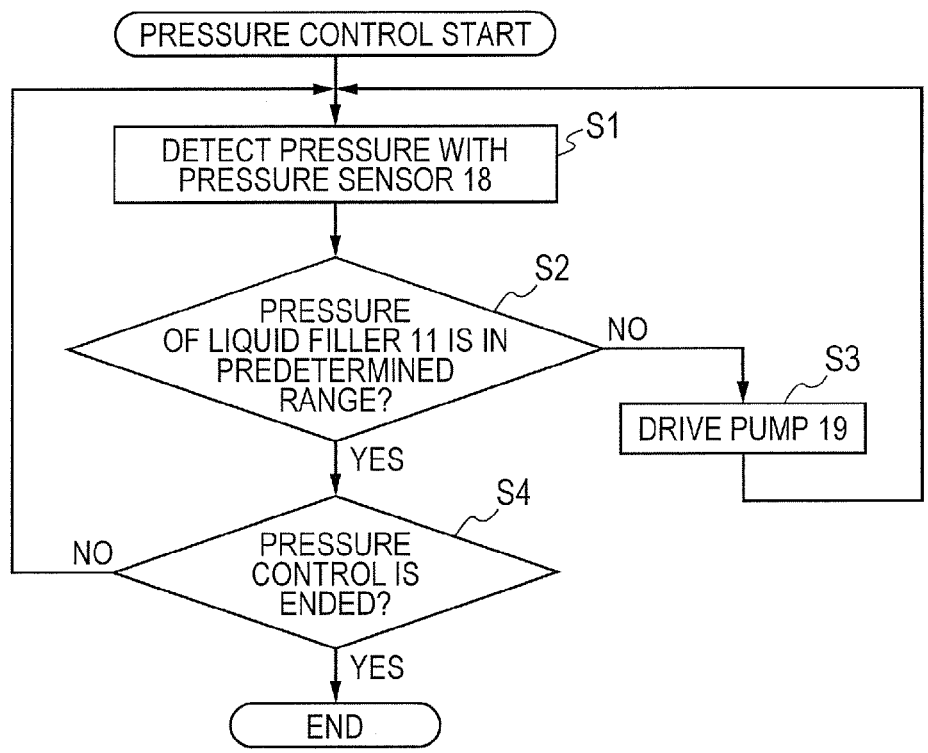
FIG. 4 is a flowchart illustrating a procedure for controlling the pressure of a liquid filler.

Next, the operation of the liquid ejection device 1 is described with reference to FIGS. 2 to 4. FIG. 3 is a view illustrating a state in which the containing bag 8 has contracted from the state illustrated in FIG. 2 along with the consumption of the liquid 9. FIG. 4 is a flowchart illustrating the pressure control of the liquid filler 11 through use of the pressure sensor 18 and the control unit 22.

When the liquid ejection device 1 is activated, the control unit 22 starts controlling the pressure in the housing 7.

When the liquid 9 is ejected from the orifice 10 of the head 3, the amount of the liquid 9 contained in the containing bag 8 is reduced, and the capacity of the containing bag 8 decreases. The housing 7 and the communication unit 13 are sealed in a state in which the valve 20 is closed, and hence the pressure of the liquid filler 11 in the housing 7 and the communication unit 13 decreases.

The control unit 22 control the pressure sensor 18 to measure the pressure of the liquid filler 11 in the communication unit 13 (Step S1). The pressure sensor 18 transmits a signal corresponding to the measured pressure of the liquid filler 11 to the control unit 22. Then, the control unit 22 controls the operation of the pump 19 and the valve 20 based on the signal transmitted from the pressure sensor 18.

Specifically, the control unit 22 determines whether or not the pressure value of the liquid filler 11 in the communication unit 13 falls within a predetermined range (Step S2). In the case where the control unit 22 determines that the pressure value of the liquid filler 11 in the communication unit 13 is lower than the predetermined range, the control unit 22 opens the valve 20 and drives the pump 19 (Step S3). When the pump 19 feeds the liquid filler 11 from the storage tank 21 to the housing 7, the pressure in the housing 7 increases (filling step).

After that, the pressure sensor 18 measures the pressure of the liquid filler 11 in the communication unit 13 again (Step S1), and the control unit 22 determines whether or not the pressure value of the liquid filler 11 in the communication unit 13 falls within the predetermined range (Step S2). In the case where the control unit 22 determines that the pressure value of the liquid filler 11 in the communication unit 13 returns to the predetermined range, the control unit 22 closes the valve 20 and stops the pump 19. As a result, the liquid filler 11 is not fed from the storage tank 21 to the housing 7, and the increase in pressure in the housing 7 stops.

In this way, when the control unit 22 controls the operation of the valve 20 and the pump 19 based on the results measured with the pressure sensor 18, the pressure in the housing 7 is adjusted within the predetermined range (pressure adjusting step).

Note that, in the case where the pressure in the housing 7 increases excessively, the liquid filler 11 is transported from the housing 7 to the storage tank 21 through use of the pump 19. Thus, the pressure in the housing 7 decreases.

When the pressure in the housing 7 is adjusted, the control unit 22 determines whether or not to end the pressure control (Step S4). In the case where the control unit 22 determines not to end the pressure control, the control unit 22 controls the pressure sensor 18 to measure the pressure of the liquid filler 11 in the communication unit 13 (Step S1).

In this embodiment, the pressure of the liquid 9 in the head 3 is adjusted, and hence the meniscus of the liquid 9 at the orifice 10 is kept in a satisfactory state. Thus, the ejection stability of the head 3 is enhanced.

In particular, the liquid filler 11 is filled into the second containing space along with the consumption of the liquid 9, and hence the pressure of the liquid 9 in the head 3 is maintained irrespective of the consumption amount of the liquid 9. This works advantageously to the liquid ejection device 1 having a larger capacity of the housing 7. The replacement frequency of the liquid containing unit 4 can be lowered by increasing the capacity of the housing 7.

In the liquid ejection device disclosed in Japanese Patent Application Laid-Open No. 2006-192785, the volume of the ink tank and the consumption amount of the liquid are presumed based on the deformation amount of the ink tank, and the pressure of the liquid in the ink tank is obtained. The deformation of the ink tank is not uniform, and hence it is difficult to accurately presume the volume of the ink tank based on the deformation amount of the ink tank. If the volume of the ink tank is not obtained accurately, the pressure of the liquid in the ink tank cannot be maintained to be a predetermined value, and the meniscus of the liquid 9 at the orifice 10 is deteriorated. As a result, the ejection stability of the head 3 is degraded.

In this embodiment, the housing 7 is filled with the liquid 9 and the liquid filler 11, and hence the pressure value of the liquid 9 is obtained merely by measuring the pressure value of the liquid filler 11. A change in pressure of the liquid filler 11 is hardly influenced by the deformation form of the containing bag 8. Thus, a more accurate pressure value of the liquid 9 is obtained by measuring the pressure value of the liquid filler 11.

When the more accurate pressure value of the liquid 9 is obtained, the pressure of the liquid 9 in the head 3 is kept to be a desired negative pressure, and the meniscus of the liquid 9 at the orifice 10 is kept in a satisfactory state. As a result, the ejection stability of the head 3 is enhanced.

In this embodiment, the liquid filler 11 and the liquid 9 are in a liquid form, and hence the volume variation thereof is smaller than that of gas, and the pressure thereof does not change abruptly.

When the containing bag 8 has contracted along with the consumption of the liquid 9 as illustrated in FIG. 3, the liquid filler 11 is refilled into the housing 7. The density difference between the liquid filler 11 and the liquid 9 is relatively small. Therefore, even when the volume ratio between the liquid filler 11 and the liquid 9 in the housing 7 changes, a change in density in the housing 7 involved in the consumption of the liquid 9 is relatively small. It is not necessary to correct the pressure variation involved in the change in volume ratio, with the result that the liquid ejection device 1 can be simplified.

(Second Embodiment)

Figure 5:
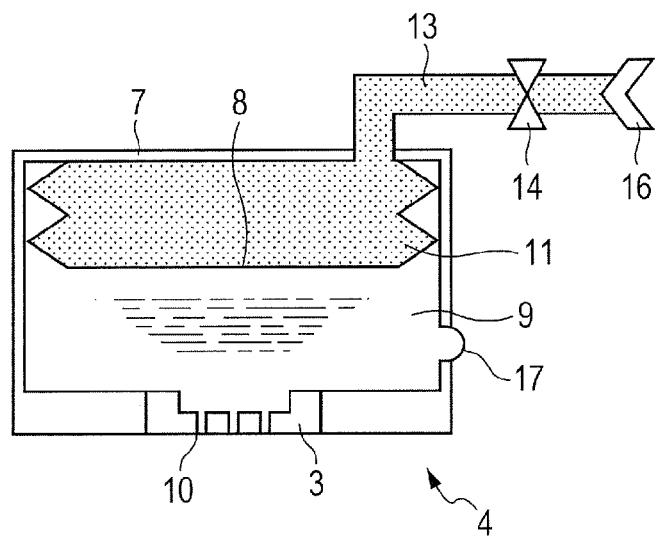
FIG. 5 is a schematic view of a liquid containing unit provided in a liquid ejection device according to a second embodiment of the present invention.

A second embodiment of the present invention is described with reference to FIG. 5. FIG. 5 is a schematic view of a liquid containing unit provided in a liquid ejection device according to this embodiment. Note that, the same elements as those in the first embodiment are denoted by the same reference symbols, and the descriptions thereof are omitted.

In this embodiment, as illustrated in FIG. 5, the liquid filler 11 is filled into the inner space of the flexible containing bag 8, and the liquid 9 is filled into the space between the outer side surface of the containing bag 8 and the housing 7. That is, the inner space of the flexible containing bag 8 forms a second containing space to be filled with the liquid filler 11, and the space between the outer side surface of the containing bag 8 and the housing 7 forms a first containing space containing the liquid 9. The containing bag 8 communicates with the pressure adjusting unit 12 via the communication unit 13 (see FIG. 1).

When the liquid 9 is ejected from the orifice 10, the pressure in the housing 7 and the communication unit 13 decreases. When the pressure falls out of a predetermined range, the liquid filler 11 is introduced into the containing bag 8. As a result, the pressure in the housing 7 and the communication unit 13 is maintained within the predetermined range.

The remaining configuration is the same as that of the first embodiment, and hence the descriptions thereof are omitted. The liquid ejection device 1 according to this embodiment also exhibits the effects similar to those of the first embodiment.

(Third Embodiment)

Figure 6:
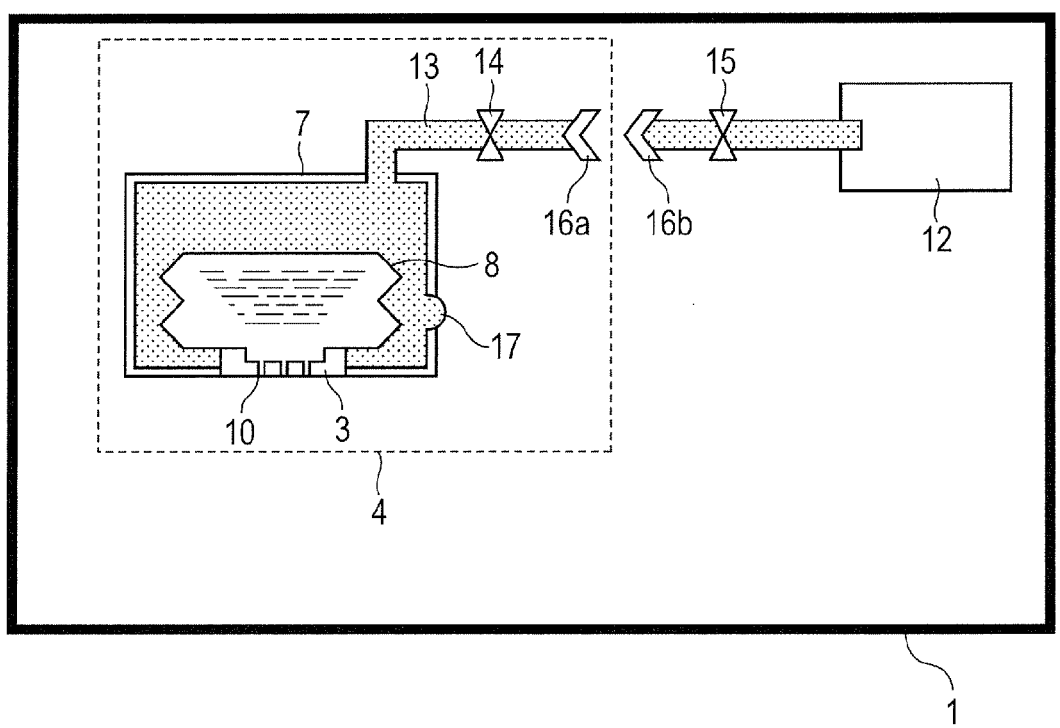
FIG. 6 is a schematic view of a liquid ejection device according to a third embodiment of the present invention.

A third embodiment of the present invention is described with reference to FIG. 6. FIG. 6 is a schematic view of a liquid ejection device according to this embodiment. Note that, the same elements as those in the first embodiment are denoted by the same reference symbols, and the descriptions thereof are omitted.

The liquid containing unit 4 is formed detachably with respect to a main body of the liquid ejection device 1. Thus, in the case where the liquid containing unit 4 is broken or the case where the liquid 9 contained in the containing bag 8 is consumed completely, the liquid ejection device 1 can be ready to be used again merely by replacing the liquid containing unit 4.

A joint 16 is formed so as to be separable into two joint portions 16a and 16b. By providing the joint 16 at the communication unit 13, the communication unit 13 can be separated from the pressure adjusting unit 12 between the pressure adjusting unit 12 and the valve 14. As a result, the liquid containing unit 4 can be detachably mounted on the main body of the liquid ejection device 1.

When the liquid containing unit 4 is removed from the main body of the liquid ejection device 1, the valves 14 and 15 are closed. When the valve 14 is closed, the internal pressure of the housing 7 is maintained to be a negative pressure, and the leakage of the liquid 9 from the orifice 10 is prevented. When the valve 15 is closed, the liquid filler 11 is not fed from the pressure adjusting unit 12 any more, and the leakage of the liquid filler 11 is prevented.

The remaining configuration is the same as that of the first embodiment, and hence the descriptions thereof are omitted.

In the case where the liquid containing unit 4 is removed from the liquid ejection device 1, and the liquid containing unit 4 is conveyed, vibration is applied to the liquid containing unit 4. The rocking of the containing bag 8 is suppressed, and hence the variation in pressure of the liquid 9 in the head 3 is suppressed. Thus, even when only the liquid containing unit 4 is conveyed, the leakage of the liquid 9 from the head 3 is suppressed.

The liquid ejection device 1 according to this embodiment also exhibits the effects similar to those of the first embodiment.

(Fourth Embodiment)

Figure 7:
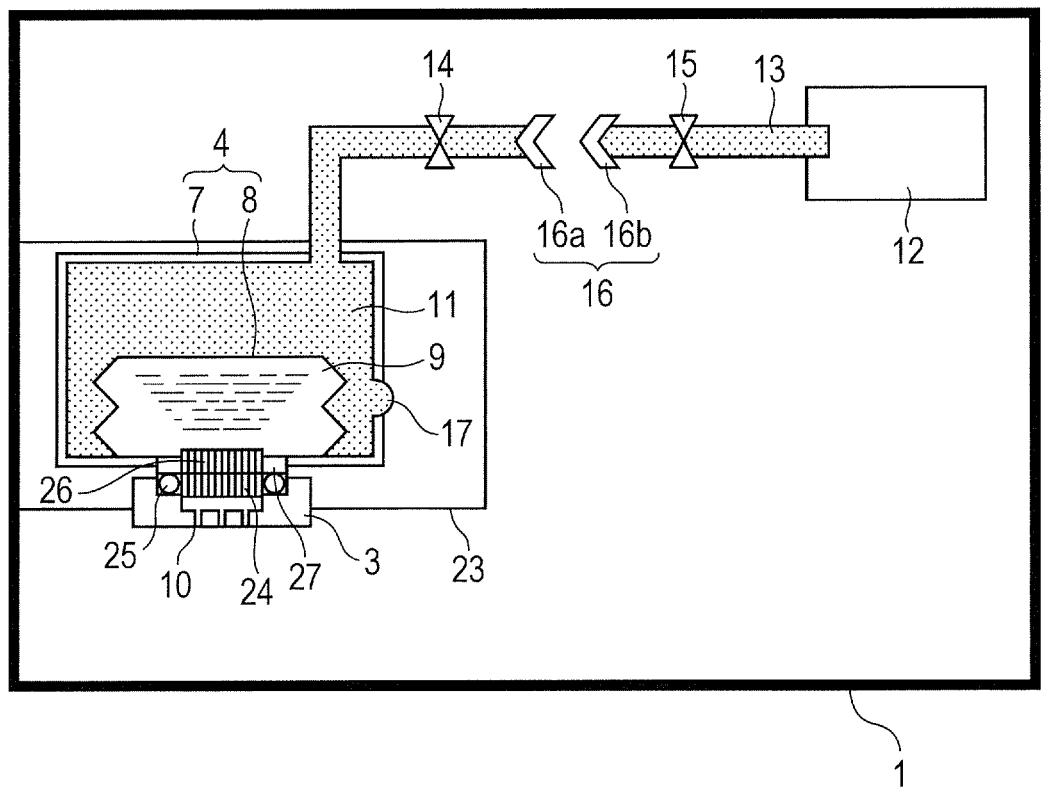
FIG. 7 is a schematic view of a liquid ejection device according to a fourth embodiment of the present invention.

A fourth embodiment of the present invention is described with reference to FIG. 7. FIG. 7 is a schematic view of a liquid ejection device according to this embodiment. Note that, the same elements as those in the first embodiment are denoted by the same reference symbols, and the descriptions thereof are omitted.

In this embodiment, the head 3 is not fixed to the liquid containing unit 4, and the head 3 and the liquid containing unit 4 can be mounted on the main body of the liquid ejection device 1 separately.

As illustrated in FIG. 7, the liquid ejection device 1 includes a head mounting portion 23 on which the head 3 is mounted. The head 3 includes a head filter 24 provided in a flow path communicating with the orifice 10 and an O-ring 25 disposed at an opening edge of the flow path.

The liquid containing unit 4 includes a container filter 26 provided in a flow path communicating with the first containing space containing the liquid 9 and an O-ring abutment portion 27 against which the O-ring 25 is brought into abutment. When the liquid containing unit 4 is brought into abutment against the head 3 so that the O-ring 25 and the O-ring abutment portion 27 come into close contact with each other, the orifice 10 of the head 3 and the first containing space of the liquid containing unit 4 communicate with each other via the head filter 24 and the container filter 26.

When the O-ring 25 and the O-ring abutment portion 27 come into close contact with each other, a gap between the head 3 and the liquid containing unit 4 is closed. As a result, the flow of air into the head 3 and the liquid containing unit 4 is suppressed.

The container filter 26 is a member having fine pores, and the meniscus of the liquid 9 in the pore of the container filter 26 and the pressure in the housing 7 are well-balanced. Thus, even when the liquid containing unit 4 is not held in abutment against the head 3, the liquid 9 does not leak from the container filter 26.

The liquid 9 in the liquid containing unit 4 is filled into the head 3 via the container filter 26 and the head filter 24 by sucking out the liquid 9 from the orifice 10 of the head 3 through use of a suction unit (not shown).

The remaining configuration is the same as that of the first embodiment, and hence the descriptions thereof are omitted. The liquid ejection device 1 according to this embodiment also exhibits the effects similar to those of the first embodiment.

(Fifth Embodiment)

Figure 8:
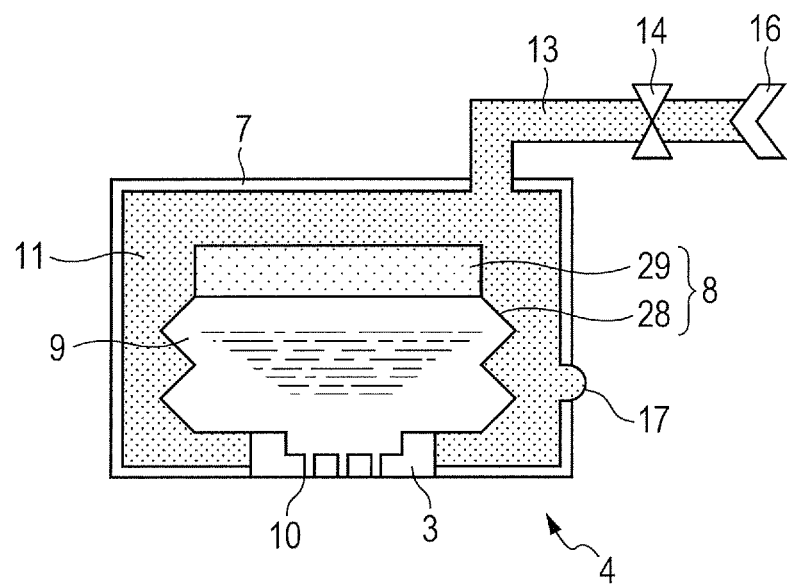
FIG. 8 is a schematic view of a liquid containing unit provided in a liquid ejection device according to a fifth embodiment of the present invention.

A fifth embodiment of the present invention is described with reference to FIG. 8. FIG. 8 is a schematic view of a liquid containing unit 4 provided in a liquid ejection device according to this embodiment. Note that, the same elements as those in the first embodiment are denoted by the same reference symbols, and the descriptions thereof are omitted.

As illustrated in FIG. 8, the containing bag 8 includes a bellows portion 28 and a lid portion 29 for closing one opening of the bellows portion 28. The other opening of the bellows portion 28 is closed with the head 3, and the orifice 10 of the head 3 and the inner space of the bellows portion 28 communicate with each other.

The lid portion 29 is a member which is not likely to be deformed, compared to the bellows portion 28. A relatively thick plate-shaped or sheet-shaped elastic member can be used as the lid portion 29. It is desired that the density of the lid portion 29 be almost the same as that of the liquid filler 11 and the liquid 9. For example, a plate member formed of polypropylene having a density of from 0.9 g/cm$^3$ to 0.92 g/cm$^3$ is more desirably used as the lid portion 29.

When the liquid 9 is ejected from the orifice 10, the amount of the liquid 9 contained in the containing bag 8 is reduced, and the capacity of the containing bag 8 decreases. At this time, the bellows portion 28 contracts. The lid portion 29 is not likely to be deformed, compared to the bellows portion 28, and hence the flexible containing bag 8 can be protected from unintended deformation. When the flexible containing bag 8 contracts as intended, the liquid 9 can be consumed efficiently.

The remaining configuration is the same as that of the first embodiment, and hence the descriptions thereof are omitted. The liquid ejection device 1 according to this embodiment also exhibits the effects similar to those of the first embodiment.

(Sixth Embodiment)

Figure 9:
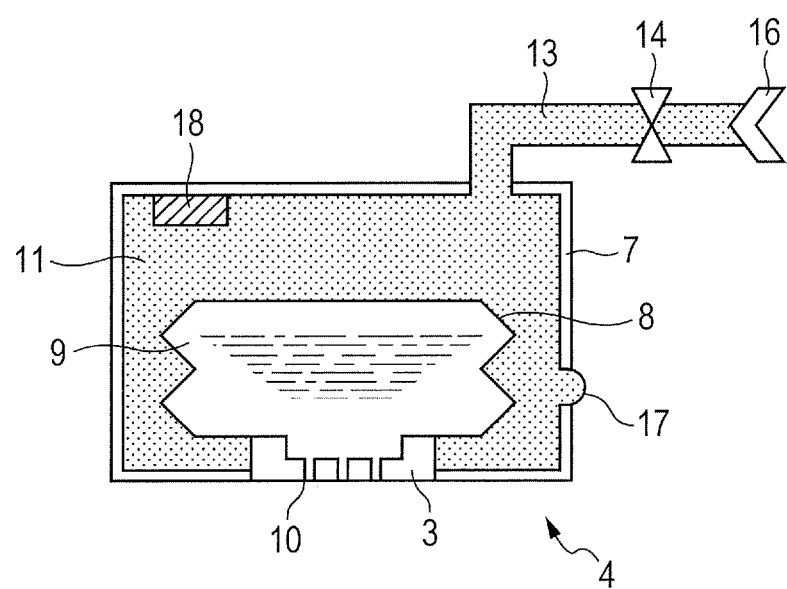
FIG. 9 is a schematic view of a liquid containing unit provided in a liquid ejection device according to a sixth embodiment of the present invention.

A sixth embodiment of the present invention is described with reference to FIG. 9. FIG. 9 is a schematic view of a liquid containing unit 4 provided in a liquid ejection device 1 according to this embodiment. Note that, the same elements as those in the first embodiment are denoted by the same reference symbols, and the descriptions thereof are omitted.

In this embodiment, as illustrated in FIG. 9, the pressure sensor 18 is disposed on the inner side surface of the housing 7. Thus, the pressure of the liquid filler 11 in the housing 7 can be measured more accurately.

As the pressure sensor 18, a sensor which is not likely to be deformed by the variation in pressure in the housing 7 and the influence of an external force is preferably used. When such a sensor is used, the pressure sensor 18 disposed on the inner side surface of the housing 7 can be considered as a wall of the housing 7. Thus, even in the case where the pressure sensor 18 is disposed on the inner side surface of the housing 7, the pressure in the housing 7 can be controlled stably.

What is considered to be the wall of the housing 7 is not limited to the pressure sensor 18, and any member which is not deformed by the variation in pressure in the housing 7 and the influence of an external force is considered to be the wall of the housing 7 by being disposed on the inner side surface of the housing 7.

The remaining configuration is the same as that of the first embodiment, and hence the descriptions thereof are omitted. The liquid ejection device 1 according to this embodiment also exhibits the effects similar to those of the first embodiment.

(Seventh Embodiment)

Figure 10:
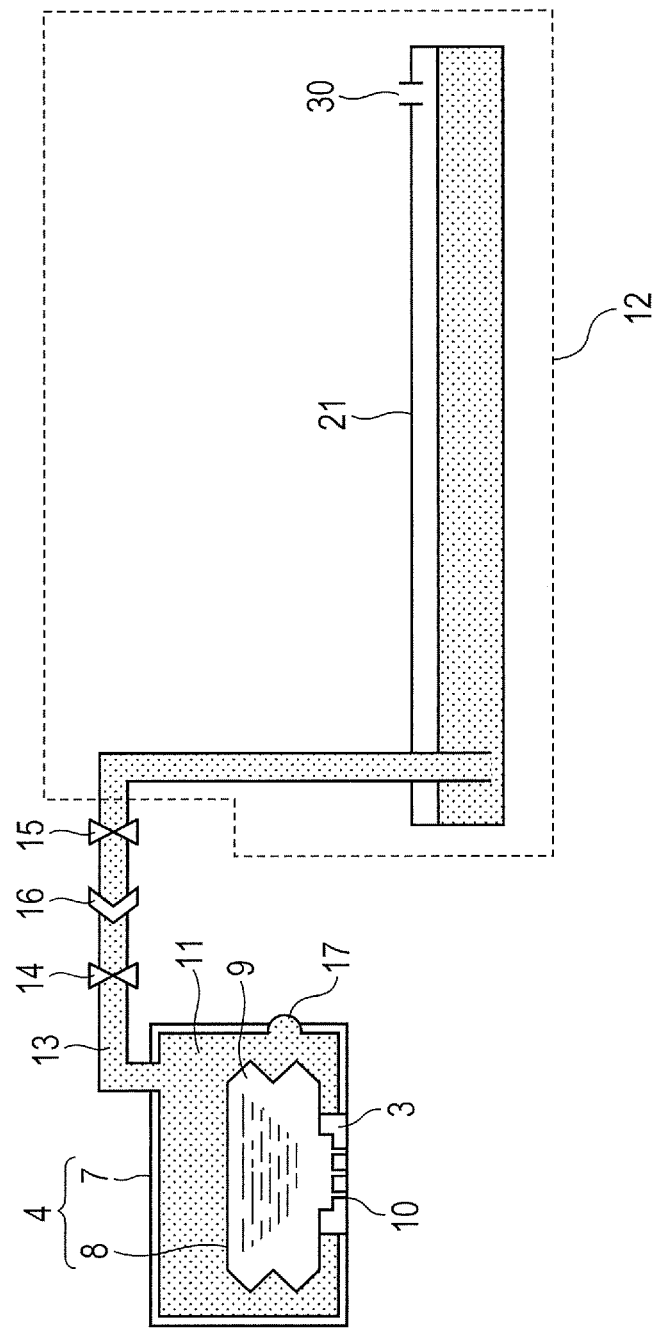
FIG. 10 is a schematic view illustrating an example of a pressure adjusting unit.

A seventh embodiment of the present invention is described with reference to FIG. 10. FIG. 10 is a schematic view of a liquid containing unit 4 and a pressure adjusting unit 12 provided in a liquid ejection device according to this embodiment. Note that, the same elements as those in the first embodiment are denoted by the same reference symbols, and the descriptions thereof are omitted.

As illustrated in FIG. 10, the pressure adjusting unit 12 includes the storage tank 21 having an air communication hole 30 formed therein. The storage tank 21 is disposed below an orifice surface of the head 3 in a vertical direction. Thus, a negative pressure acts on the liquid 9 at the orifice 10 of the head 3. The value of a pressure which acts on the liquid 9 at the orifice 10 is determined based on the distance in the vertical direction from the orifice surface of the head 3 to the liquid level of the liquid filler 11 stored in the storage tank 21.

In this embodiment, the pressure of the liquid 9 at the orifice 10 can be maintained to be a negative pressure without using the pressure sensor 18, the pump 19, the valve 20, and the control unit 22 illustrated in FIG. 2.

In this embodiment, when the liquid 9 is ejected, the volume of the containing bag 8 is reduced, and the pressure in the housing 7 decreases. As a result, the liquid filler 11 moves from the storage tank 21 to the housing 7. When the liquid filler 11 flows into the housing 7, the internal pressure of the housing 7 is maintained to be a predetermined negative pressure.

It is more preferred that the storage tank 21 have a sufficient dimension in a horizontal direction. When the dimension in the horizontal direction of the storage tank 21 is further enlarged, the liquid level of the liquid filler 11 in the storage tank 21 falls less, and a change in pressure caused by the fall of the liquid level can be suppressed.

Figure 11:
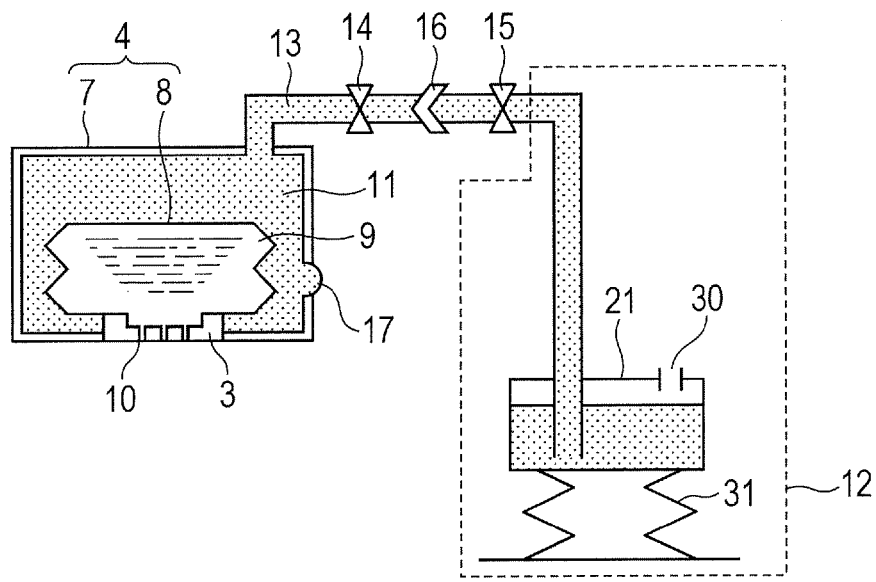
FIG. 11 is a schematic view illustrating another example of the pressure adjusting unit.

FIG. 11 is a schematic view illustrating another example of the pressure adjusting unit 12.

As illustrated in FIG. 11, the pressure adjusting unit 12 may include a lifting unit 31 for raising and lowering the storage tank 21. When the storage tank 21 is raised or lowered, the liquid level of the liquid filler 11 stored in the storage tank 21 is displaced in the vertical direction with respect to the orifice surface of the head 3, and the magnitude of the pressure acting on the liquid 9 at the orifice 10 changes.

As the lifting unit 31, for example, there is given an elastic member for supporting the storage tank 21. When the liquid filler 11 moves from the storage tank 21 to the housing 7, the liquid level of the liquid filler 11 in the storage tank 21 falls with respect to the storage tank 21, and the weight of the liquid filler 11 in the storage tank 21 is reduced.

When the weight of the liquid filler 11 in the storage tank 21 is reduced, the load on the elastic member serving as the lifting unit 31 is reduced, and the storage tank 21 is raised by virtue of the elastic force of the elastic member. By designing a spring constant of the elastic member so that the fall amount of the liquid level and the raised amount of the storage tank 21 along with the movement of the liquid filler 11 become equal to each other, the liquid level in the storage tank 21 with respect to the head 3 can be always constant.

The remaining configuration is the same as that of the first embodiment, and hence the descriptions thereof are omitted. The liquid ejection device 1 according to this embodiment also exhibits the effects similar to those of the first embodiment.

(Eighth Embodiment)

Figure 12:
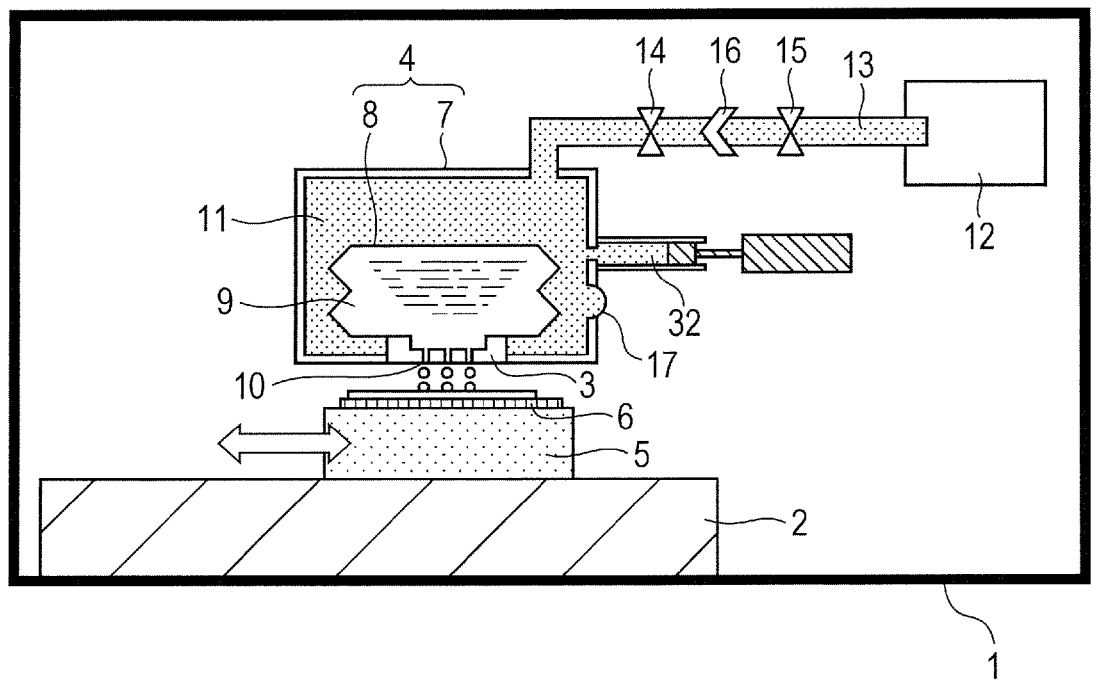
FIG. 12 is a schematic view of a liquid ejection device according to an eighth embodiment of the present invention.
Figure 13:
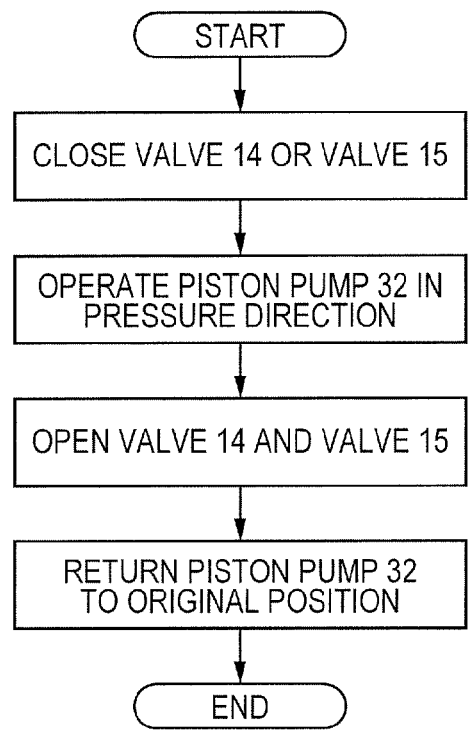
FIG. 13 is a flowchart illustrating an operation of the liquid ejection device illustrated in FIG. 12.

An eighth embodiment of the present invention is described with reference to FIGS. 12 and 13. FIG. 12 is a schematic view of a liquid ejection device 1 according to this embodiment. FIG. 13 is a flowchart illustrating an operation of the liquid ejection device 1 according to this embodiment. Note that, the same elements as those in the first embodiment are denoted by the same reference symbols, and the descriptions thereof are omitted.

As illustrated in FIG. 12, the liquid ejection device 1 includes a piston pump 32 serving as a pressurizing unit. The piston pump 32 is connected to a drive mechanism and injects the liquid filler 11 into the housing 7 in response to the operation of the drive mechanism to pressurize the inside of the housing 7. The elements other than the piston pump 32 are the same as those of the liquid ejection device 1 according to the first embodiment, and the liquid ejection device 1 according to this embodiment also exhibits the same effects as those of the first embodiment.

In the case of using ink as the liquid 9, the viscosity of the ink at the orifice 10 increases to hinder the ink from being ejected from the orifice 10 in some cases. This is liable to occur particularly in the case where the liquid ejection device 1 is suspended for a long time period.

Further, air bubbles are accumulated in the vicinity of the orifice 10 to hinder the liquid 9 from being ejected from the orifice 10 in some cases. This is liable to occur particularly in the case where the liquid ejection device 1 is operated continuously.

When the piston pump 32 injects the liquid filler 11 into the housing 7, the liquid 9 increased in viscosity and the air bubbles in the vicinity of the orifice 10 are forcibly discharged from the orifice 10. As a result, the thickened liquid 9 and the air bubbles are removed from the orifice 10, with the result that the liquid 9 can be ejected satisfactorily from the orifice 10.

In this embodiment, the liquid ejection device 1 includes the piston pump 32 serving as the pressurizing unit, and hence the liquid ejection device 1 can exhibit the same effects as those of the first embodiment and in addition can solve the problem of non-ejection caused by the thickened liquid 9 and the air bubbles.

The operation of the liquid ejection device 1 upon the discharge of the thickened liquid 9 and the air bubbles is described with reference to FIGS. 12 and 13.

First, at least one of the valve 14 and the valve 15 is closed, and the liquid filler 11 is injected into the housing 7 through use of the piston pump 32. The housing 7 is filled with the incompressible liquid 9 and the liquid filler 11, and hence the liquid 9 is pushed out from the orifice 10 of the head 3 in a volume substantially equal to that of the liquid filler 11 injected into the housing 7 through use of the piston pump 32.

The pressure for pushing out the liquid 9 is determined by the dimension of the piston pump 32 and the force generated by the drive mechanism connected to the piston pump 32. By using the piston pump 32 and the drive mechanism configured to generate a larger force, a higher pressure is applied to the liquid 9, and the liquid 9 having a relatively high viscosity can be pushed out from the orifice 10 more easily.

By providing a buffer 17 at the housing 7, a relatively high pressure is not likely to be instantaneously applied to the liquid filler 11 in the housing 7, with the result that the outflow of a great amount of the liquid 9 from the orifice 10 can be suppressed. Further, as a result of the configuration in which the relatively high pressure is not likely to be instantaneously applied to the liquid filler 11 in the housing 7, parts having inferior strength can be prevented from being broken.

In the case where the movable volume of the buffer 17 is smaller than the amount of the liquid filler 11 to be pushed out through use of the piston pump 32, the liquid 9 is pushed out from the orifice 10 at least only in a difference amount.

In the case of setting the movable volume of the buffer 17 to be larger than the amount of the liquid filler 11 to be pushed out through use of the piston pump 32, the pressure obtained when the buffer 17 expands is designed appropriately. With this design, the pressure in the housing 7 increases at the same time of the expansion of the buffer 17, and the liquid 9 is pushed out from the orifice 10.

In any case, the discharge of the thickened liquid 9 and the air bubbles from the orifice 10 enables the liquid 9 to pass through the orifice 10 easily. As a result, the liquid 9 flows out from the orifice 10 in substantially the same amount as that of the liquid filler 11 injected into the housing 7 through use of the piston pump 32.

When the liquid filler 11 is injected into the housing 7 through use of the piston pump 32, the valves 14 and 15 are opened, and the piston pump 32 is slowly returned to the original position. When the valves 14 and 15 are opened, the pressure adjusting unit 12 adjusts the pressure of the liquid filler 11 in the housing 7. Thus, the piston pump 32 is relatively slowly returned to the original position so that the internal pressure of the housing 7 can be kept to be a predetermined negative pressure, and hence the head 3 can start ejection.

When the thickened liquid 9 and the air bubbles in the vicinity of the orifice 10 are discharged, liquid droplets adhere to the orifice surface in some cases. The liquid droplets adhering to the orifice surface are removed by a well-known method involving wiping the orifice surface with a wiper blade or the like. The liquid droplets on the orifice surface may be removed before or after the piston pump 32 is returned to the original position by opening the valves 14 and 15.

There is a problem in that a movable mechanism such as a pump generally generates particles along with its operation. In this embodiment, the piston pump 32 is not held in contact with the liquid 9, and hence particles generated by the operation of the piston pump 32 are mixed only with the liquid filler 11 but not with the liquid 9. Thus, there is an advantage in that the contamination of the liquid 9 can be suppressed.

As a unit for pressurizing a fluid, a pump whose flow rate varies depending on a pressure loss of a flow path such as a turbine pump and a so-called positive displacement pump for transporting a liquid at a substantially constant flow rate depending on a drive amount have been known. Examples of the positive displacement pump include a piston pump, a gear pump, a tube pump, and a diaphragm pump.

The present invention is not limited to the configuration in which the piston pump 32 is used as the pressurizing unit. It is preferred that a positive displacement pump be used as the pressurizing unit. The use of the positive displacement pump has an advantage in that the discharge of the liquid 9 in an amount more than necessary can be suppressed while the liquid filler 11 is being pressurized with a higher pressure.

Japanese Patent Application Laid-Open No. 2008-105360 discloses a maintenance method involving discharging a thickened liquid in a nozzle by supplying air into a float. More specifically, when air is supplied into the float, the pressure of the gas in the float increases and the float expands. As a result, the thickened ink is discharged from the nozzle.

However, according to the maintenance method disclosed in Japanese Patent Application Laid-Open No. 2008-105360, even when the supply of air into the float is stopped, the discharge of ink from the nozzle cannot be stopped instantaneously. This is because the pressure of the gas in the float has increased. Thus, there is a risk in that ink in an amount larger than a desired amount may be discharged.

In the liquid ejection device 1 according to this embodiment, the thickened liquid 9 and the air bubbles at the orifice 10 can be discharged depending on the pressuring pressure of the pressurizing unit. In this case, the amount of the liquid 9 to be discharged is substantially equal to that of the liquid filler 11 to be fed by the pressurizing unit. Thus, the amount of the liquid 9 to be discharged can be adjusted more accurately.

(Ninth Embodiment)

Figure 14:
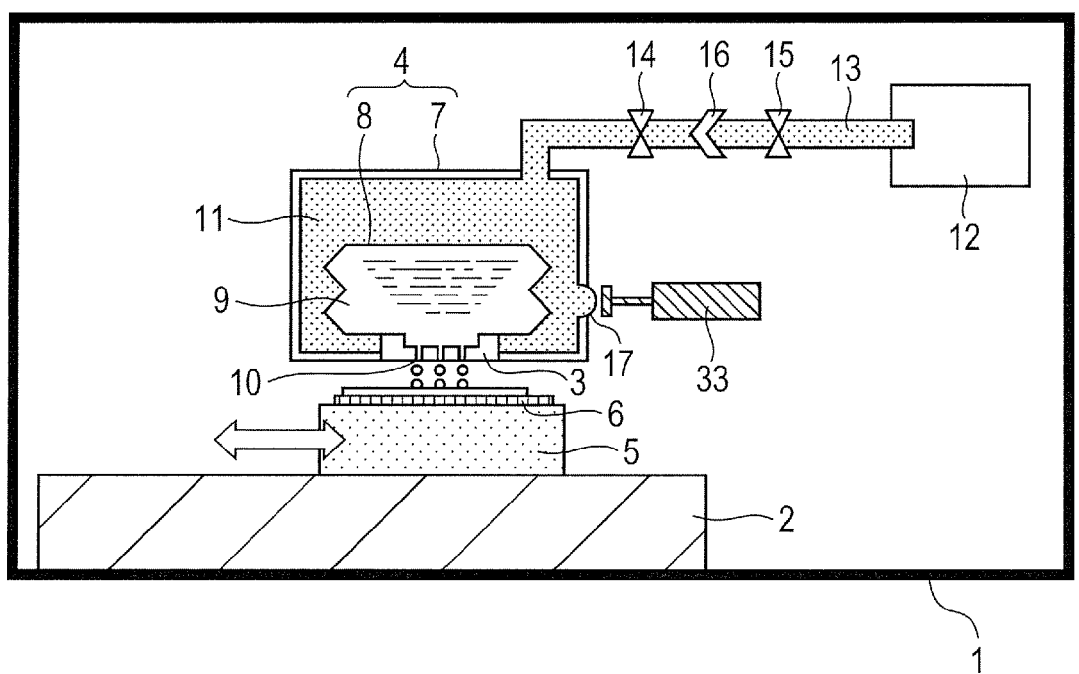
FIG. 14 is a schematic view of a liquid ejection device according to a ninth embodiment of the present invention.

A ninth embodiment of the present invention is described with reference to FIGS. 14, 15A and 15B. FIG. 14 is a schematic view of a liquid ejection device 1 according to this embodiment. Note that, the same elements as those in the first to eighth embodiments are denoted by the same reference symbols, and the descriptions thereof are omitted.

As illustrated in FIG. 14, the liquid ejection device 1 includes a pressing mechanism 33 serving as a pressurizing unit. The pressing mechanism 33 presses a flexible film of the buffer 17. This embodiment is the same as the eighth embodiment in the other points, and the liquid ejection device 1 according to this embodiment also exhibits the same effects as those of the first embodiment.

In a state in which the pressing mechanism 33 presses the flexible film of the buffer 17, the buffer 17 hardly functions. Therefore, the pressure of the liquid filler 11 in the housing 7 can be increased merely by feeding the liquid filler 11 to the housing 7, and the air bubbles and thickened ink at the orifice 10 can be forcefully pushed out.

Figure 15A:
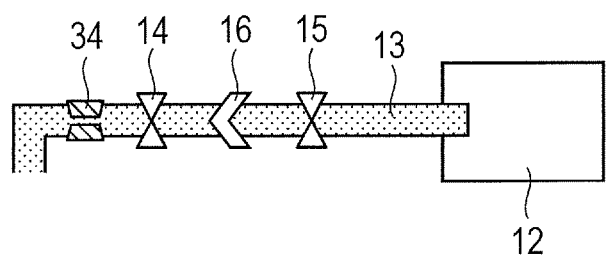
FIGS. 15A and 15B are enlarged views of the periphery of a communication unit.

FIG. 15A is an enlarged view of the pressure adjusting unit 12 and the communication unit 13. As illustrated in FIG. 15A, an orifice 34 may be provided to the communication unit 13 connecting the housing 7 to the pressure adjusting unit 12.

When the orifice 34 is provided to the communication unit 13, the liquid filler 11 in the housing 7 cannot easily flow toward the pressure adjusting unit 12 even without closing the valves 14 and 15. Thus, the pressure in the housing 7 is increased by pressing the flexible film of the buffer 17 abruptly with the pressing mechanism 33, with the result that the air bubbles and thickened ink are pushed out from the orifice 10.

Note that, the orifice 34 hinders the liquid filler 11 from easily flowing from the pressure adjusting unit 12 to the housing 7. However, the flow rate per unit time of the liquid filler 11 when the head 3 is driven to eject the liquid 9 is much smaller than that in the case where the pressing mechanism 33 is moved abruptly. Therefore, the flow resistance of the orifice 34 regarding the flow of the liquid filler 11 from the pressure adjusting unit 12 to the housing 7 is negligible.

It is more preferred that the dimension of the orifice 34 be optimized so as not to allow the flow resistance of the orifice 34 to have adverse effects.

Figure 15B:
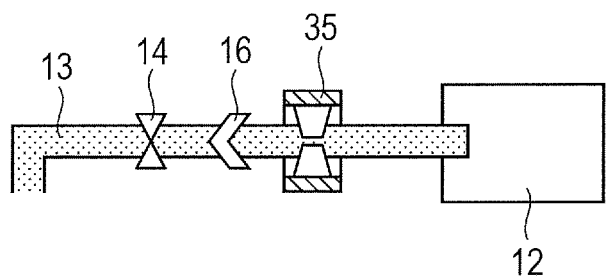

FIG. 15B is an enlarged view illustrating another example of the pressure adjusting unit 12 and the communication unit 13. A valve with an orifice 35 may be provided to the communication unit 13 in place of the valve 15 (see FIG. 15A). The valve with an orifice 35 serves as a valve when closed and serves as an orifice when opened.

(Tenth Embodiment)

A tenth embodiment of the present invention is described with reference to FIG. 16. FIG. 16 is a schematic view of a liquid ejection device according to this embodiment. Note that, the same elements as those in the first embodiment are denoted by the same reference symbols, and the descriptions thereof are omitted.

As illustrated in FIG. 16, the liquid ejection device 1 includes a deaeration device 36 for removing gas contained in the liquid filler 11, a pump 37, and a temperature control device 38. The liquid filler 11 circulates through the housing 7, the deaeration device 36, and the temperature control device 38. A communication unit allowing the temperature control device 38 and the liquid containing unit 4 to communicate with each other is provided with valves 39 and 40 and a joint 41.

The remaining configuration is the same as that of the first embodiment, and hence the descriptions thereof are omitted. The liquid ejection device 1 according to this embodiment also exhibits the effects similar to those of the first embodiment.

In this embodiment, the liquid filler 11 which has been deaerated and controlled for temperature is supplied to the housing 7, and hence the temperature of the liquid 9 in the flexible containing bag 8 is kept constant and air bubbles are not likely to be generated in the housing 7. Thus, the flexible member forming the containing bag 8 does not need to have a gas barrier property.

Further, by forming the containing bag 8 of a flexible member having a low gas barrier property, the air bubbles generated in the liquid 9 move to the liquid filler 11 through the containing bag 8. The air bubbles do not remain in the liquid 9 even when the liquid 9 which has not been deaerated is used, and hence the stability of the ejection performance of the head 3 can be enhanced. As a result, the liquid ejection device 1 can be operated continuously for a long time period. This is suitable for an industrial inkjet device which is required to have particularly high reliability.

Note that, the air bubbles generated in the liquid 9 and moved to the liquid filler 11 are removed from the liquid filler 11 through use of the deaeration device 36.

The flexible member forming the containing bag 8 may be a member having a relatively low gas barrier property. Further, the liquid filler 11 suppresses the rocking of the containing bag 8, and hence the containing bag 8 can be formed of a thin and soft material. As an example, a polyethylene film or the like having a thickness of about 5 µm can also be used.

There is a risk in that molecules of the components such as the liquid filler 11 and the liquid 9 as well as gas molecules may permeate through a thin film having a low gas barrier property in a trace amount. Regarding the permeation of the liquid components, the same liquid as the liquid 9 or a main component of the liquid 9 may be used as a main component of the liquid filler 11. Although the composition ratio of the components of the liquid 9 changes due to the permeation of the molecules with each other, the amount of the molecules to permeate through the film is small, and hence a change in composition ratio of the liquid 9 is very small and negligible.

Note that, although almost the entire flexible containing bag 8 is formed of a film in the illustrated example, part of the containing bag 8 may be formed of a material having high stiffness such as a stainless plate. By using the stainless plate or the like, the shape of the flexible containing bag 8 can be stabilized and the housing 7 can be downsized. Further, the breakage of the containing bag 8 during the filling of the liquid 9 can be suppressed even in the case where the flexible film does not have sufficient strength.

Although the density of the stainless plate is larger than that of the liquid 9, if the stainless plate is immovably fixed to the non-flexible housing 7, the influence caused by the difference between the density of the stainless plate and the density of the liquid 9 can be suppressed.

When the thickened liquid 9 and the like are discharged, it is only necessary that the valve 14 or 15 be closed and the pump 37 be operated. The pump 37 serves as a pressurizing unit to increase the pressure in the housing 7 and discharge the thickened liquid 9 from the head 3. After the pump 37 is operated by a predetermined amount, the valve 14 or 15 is opened again.

As the pump 37, a tube pump, a gear pump, or the like can be applied. These pumps have an advantage in that they can transport a fluid in a substantially constant amount in accordance with a rotation angle with a relatively simple structure. In the case of using these pumps, particles are generated along with the operation of the pumps. However, in this embodiment, the generated particles are mixed only with the liquid filler 11 but not with the liquid 9. Thus, the liquid 9 is not contaminated.

As another example, the following is also applicable.

When the thickened liquid 9 and the like are pushed out by pressurizing the liquid filler 11, it is necessary to limit the flow of the liquid filler 11 between the pressure adjusting unit 12 and the liquid containing unit 4. As a flow limiting unit, the pressure adjusting unit 12 in a suspended state can also be used.

In the case of using the pressure adjusting unit 12 provided in the liquid ejection device 1 according to the first embodiment (see FIG. 2) as an example, the flow of the liquid filler 11 can be limited by stopping the operation of the pump 19. Further, by stopping the negative pressure control using the control unit 22 and by driving the pump 19, the liquid filler 11 in the housing 7 can be pressurized.

(Eleventh Embodiment)

Figure 17:
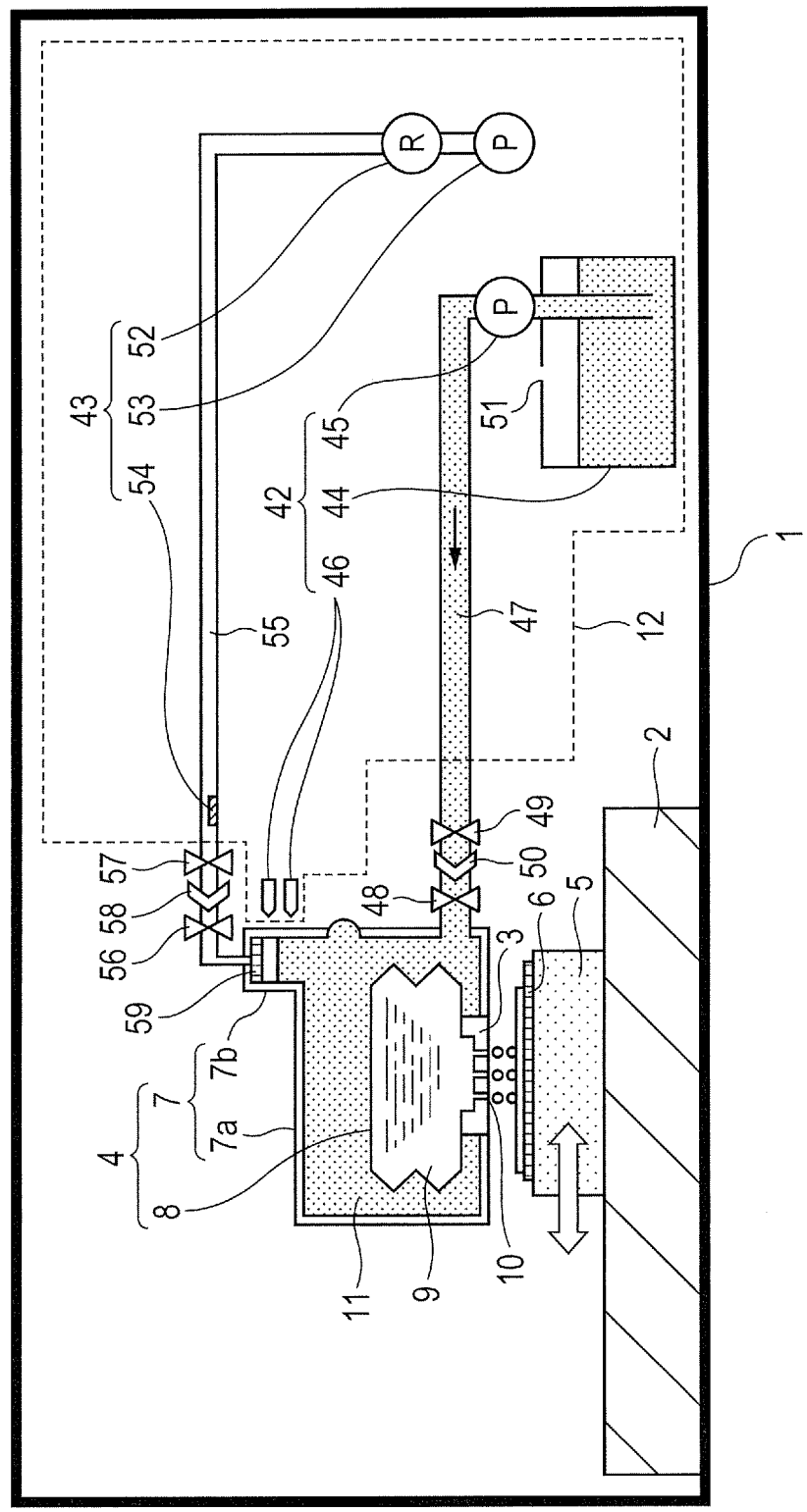
FIG. 17 is a schematic view of a liquid ejection device according to an eleventh embodiment of the present invention.

An eleventh embodiment of the present invention is described with reference to FIG. 17. FIG. 17 is a schematic view of a liquid ejection device according to this embodiment. Note that, the same elements as those in the first embodiment are denoted by the same reference symbols, and the descriptions thereof are omitted.

As illustrated in FIG. 17, the housing 7 includes a main portion 7a including first and second containing spaces and a hollow projecting portion 7b projecting from the main portion 7a in a direction opposite to a liquid ejection direction (downward direction) of the head 3. The projecting portion 7b communicates with the second containing space and contains the liquid filler 11 and gas. The pressure adjusting unit 12 includes a liquid level position control mechanism 42 and a gas pressure control mechanism 43.

The liquid level position control mechanism 42 includes a storage tank 44, a liquid feeding unit 45, and a liquid level position sensor 46. The storage tank 44 stores the liquid filler 11. The liquid feeding unit 45 transports the liquid filler 11 between the housing 7 and the storage tank 44. The liquid level position sensor 46 detects the position of the liquid level of the liquid filler 11 in the projecting portion 7b. The liquid feeding unit 45 operates based on the position of the liquid level of the liquid filler 11 in the projecting portion 7b measured with the liquid level position sensor 46.

A filler communication unit 47 for connecting the liquid feeding unit 45 and the housing 7 to each other is provided with valves 48 and 49 and a joint 50. The filler communication unit 47 can be separated at the joint 50 in a state in which the valves 48 and 49 are closed. The storage tank 44 is provided with an air communication hole 51.

The gas pressure control mechanism 43 includes a regulator 52, a pump 53, and a pressure sensor 54. The pressure sensor 54 is provided in a gas communication unit 55 for connecting the regulator 52 and the projecting portion 7b to each other and measures a relative pressure in the gas communication unit 55 with respect to the atmospheric pressure in the liquid ejection device 1. It is desired that the pressure sensor 54 be disposed at a position closer to the valve 57 so as not to be influenced easily by the external disturbance.

A control unit (not shown) drives the regulator 52 and the pump 53. The regulator 52 and the pump 53 operate based on an electric signal corresponding to the pressure measured with the pressure sensor 54. In this way, the pressure of the gas in the gas communication unit 55 and the projecting portion 7b is controlled.

The gas communication unit 55 is provided with valves 56 and 57 and a joint 58, and the gas communication unit 55 can be separated at the joint 58 in a state in which the valves 56 and 57 are closed. It is only necessary that the gas communication unit 55 be configured so as to pass gas therethrough, and the inner diameter of the gas communication unit 55 may be smaller than that of the filler communication unit 47.

By separating the filler communication unit 47 at the joint 50 and separating the gas communication unit 55 at the joint 58, the liquid containing unit 4 becomes ready to be removed from the main body of the liquid ejection device 1.

Upon the activation of the liquid ejection device 1, the gas pressure control mechanism 43 starts pressure control. The gas communication unit 55 communicates with the projecting portion 7b, and upon the control of the pressure of the gas in the gas communication unit 55, the pressure of the gas in the projecting portion 7b is controlled.

When the pressure of the gas in the projecting portion 7b is controlled, the pressure of the liquid filler 11 in the housing 7 is controlled, and the pressure of the liquid 9 in the containing bag 8 is controlled. As a result, the internal pressure in the head 3 is controlled within a predetermined range.

When the liquid 9 is ejected from the orifice 10 of the head 3, the liquid 9 in the flexible containing bag 8 is consumed, and the capacity of the flexible containing bag 8 contracts. Then, the liquid level position of the projecting portion 7b falls.

When the liquid level position sensor 46 detects that the liquid level position of the projecting portion 7b has fallen below a predetermined position, the control unit (not shown) opens the valves 48 and 49 and drives the liquid feeding unit 45. As a result, the liquid filler 11 is fed from the storage tank 44 to the housing 7 via the filler communication unit 47.

When the liquid filler 11 is fed to the housing 7, the liquid level position of the projecting portion 7b is raised. When the liquid level position sensor 46 detects that the liquid level position has fallen within a predetermined range, the control unit (not shown) stops the liquid feeding unit 45.

Thus, the operation of the liquid level position control mechanism 42 controls the liquid level position of the projecting portion 7b within the predetermined range.

A gas-liquid separation film 59 is formed between the projecting portion 7b and the gas communication unit 55. The gas-liquid separation film 59 passes gas therethrough but not a liquid.

In the case where the liquid level position control mechanism 42 goes out of order, the liquid filler 11 may be fed excessively from the storage tank 44 into the housing 7 via the filler communication unit 47 in some cases. In this case, the liquid filler 11 in the projecting portion 7b is brought into contact with the gas-liquid separation film 59. The gas-liquid separation film 59 does not pass liquid therethrough, and hence the flow of the liquid filler 11 to the gas communication unit 55 is suppressed.

Regarding a cut surface intersecting with (for example, perpendicular to) the projection direction of the projecting portion 7b (hereinafter simply referred to as "cut surface"), the cross-sectional area of the inside of the projecting portion 7b is smaller than the maximum value of the cross-sectional area of the inside of the main portion 7a. It is only necessary that the inner space of the projecting portion 7b be set in such a dimension that the pressure of gas can be controlled. Needless to say, in FIG. 17, the dimension of the projecting portion 7b in a drawing depth direction may be reduced.

The case where the liquid containing unit 4 is removed from the main body of the liquid ejection device 1 and conveyed is assumed.

In this case, the cross-sectional area of the projecting portion 7b is smaller than the maximum value of the cross-sectional area of the main portion 7a, and hence waves of the liquid filler 11 generated in the projecting portion 7b can be made relatively small. Thus, the vibration of the containing bag 8 is suppressed, and the variation in negative pressure applied to the head 3 is suppressed. As a result, the running of the liquid 9 from the orifice 10 of the head 3 can be suppressed more.

Further, the state in which the liquid containing unit 4 is mounted on the main body of the liquid ejection device 1 is assumed. In this state, an external force is applied to the gas communication unit 55 and the filler communication unit 47, and the liquid containing unit 4 vibrates in some cases.

Further, the cross-sectional area of the projecting portion 7b is smaller than the maximum value of the cross-sectional area of the main portion 7a, and hence waves of the liquid filler 11 generated in the projecting portion 7b can be made relatively small. Thus, the vibration of the containing bag 8 is suppressed, and the variation in negative pressure applied to the head 3 is suppressed. As a result, the ejection stability when the liquid 9 is ejected from the orifice 10 can be ensured.

Further, although gas is present in the gas communication unit 55 connected to the housing 7, the density of the gas is smaller than that of a liquid. The density of the gas is sufficiently small, and hence the gas in the gas communication unit 55 is sufficiently light. Thus, even when acceleration is applied to the gas in the gas communication unit 55 due to the vibration of the gas communication unit 55, a force applied from the gas to the liquid filler 11 of the projecting portion 7b is small. Therefore, the liquid filler 11 hardly vibrates, and the variation in negative pressure is suppressed.

In addition, the gas has compressibility. The gas in the projecting portion 7b and the gas communication unit 55 serves as a buffer by contracting or expanding to suppress the vibration of the liquid filler 11. As a result, the vibration of the containing bag 8 is suppressed, and the ejection stability when the liquid 9 is ejected from the orifice 10 can be ensured.

The liquid containing unit 4 is mounted on the main body of the liquid ejection device 1 and moves in the liquid ejection device 1 in some cases. Even in such a case, waves generated in the liquid filler 11 in the projecting portion 7b are relatively small, and hence the vibration of the containing bag 8 is suppressed. Thus, the variation in negative pressure applied to the head 3 is suppressed, and the running of the liquid 9 from the orifice 10 of the head 3 can be suppressed.

Now, the condition under which the liquid filler 11 does not resonate with respect to the vibrating liquid containing unit 4 during the conveyance of the liquid containing unit 4 is considered.

A maximum dimension of the inside of the projecting portion 7b in the cut surface is defined as L, a frequency of the vibration applied to the liquid containing unit 4 during the conveyance of the liquid containing unit 4 is defined as f, a gravitational acceleration is defined as g, and a circle ratio is defined as n. In this case, based on the gravitational wave equation, the liquid filler does not resonate when the following expression is satisfied.

$$L < g/(2\pi f^2)$$

The waving of the liquid filler 11 in the projecting portion 7b can be further suppressed by setting the maximum dimension L with respect to the frequency f so as to satisfy the above-mentioned expression. For example, when the frequency of the vibration applied to the liquid containing unit 4 during the conveyance of the liquid containing unit 4 is set to 5 Hz, the maximum dimension L is 62 mm or less.

The remaining configuration is the same as that of the first embodiment, and hence the descriptions thereof are omitted. The liquid ejection device 1 according to this embodiment also exhibits the effects similar to those of the first embodiment.

(Twelfth Embodiment)

Figure 18:
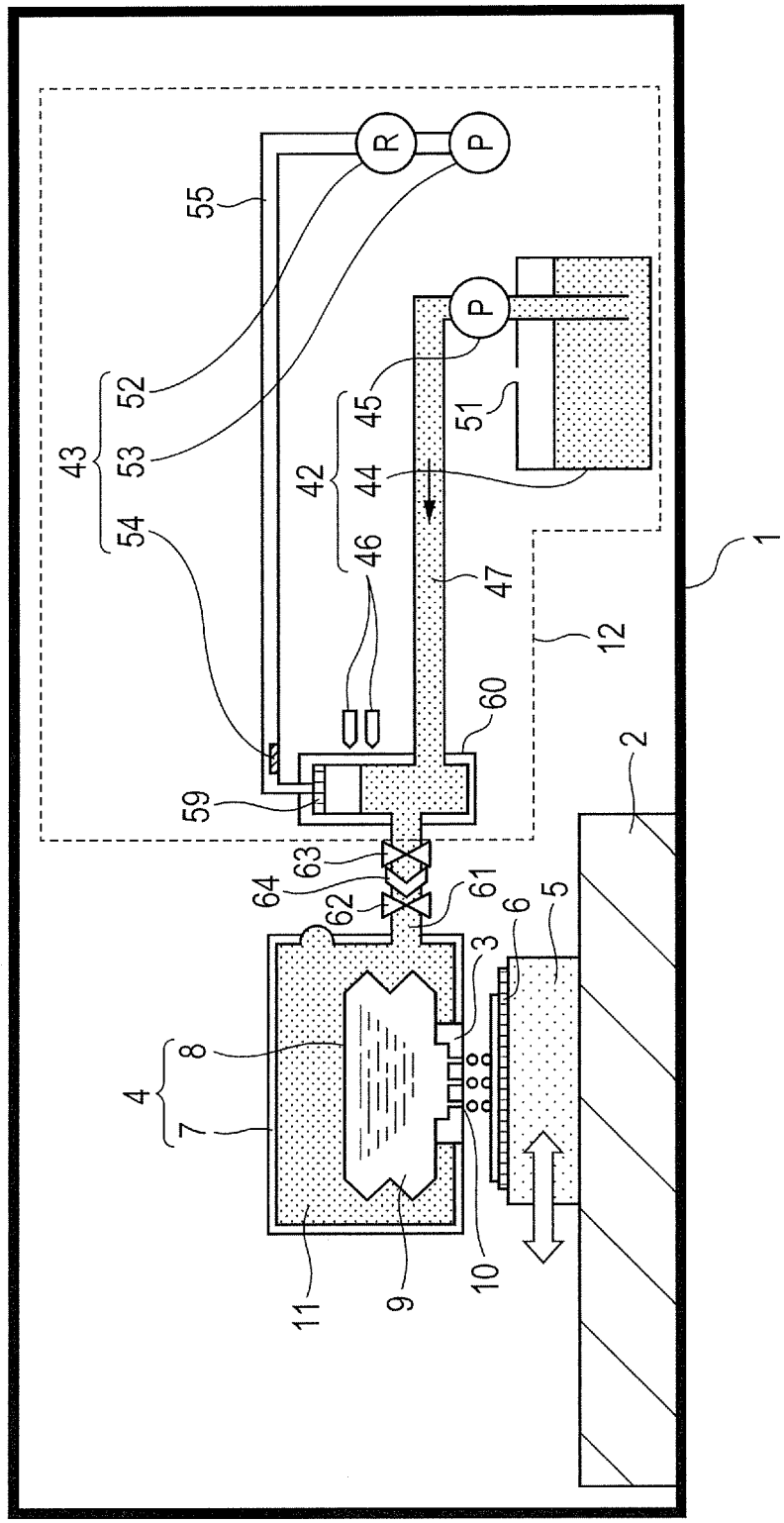
FIG. 18 is a schematic view of a liquid ejection device according to a twelfth embodiment of the present invention.

A twelfth embodiment of the present invention is described with reference to FIG. 18. FIG. 18 is a schematic view of a liquid ejection device according to this embodiment. Note that, the same elements as those in the first to eleventh embodiments are denoted by the same reference symbols, and the descriptions thereof are omitted.

As illustrated in FIG. 18, the pressure adjusting unit 12 includes an auxiliary container 60 for containing the liquid filler 11 and gas, the liquid level position control mechanism 42 for controlling the position of the liquid level in the auxiliary container 60, and the gas pressure control mechanism 43 for controlling the pressure of the gas in the auxiliary container 60. The housing 7 and the auxiliary container 60 are connected to each other through a second filler communication unit 61, and the liquid filler 11 can move between the housing 7 and the auxiliary container 60.

The second filler communication unit 61 is provided with valves 62 and 63 and a joint 64, and the second filler communication unit 61 can be separated at the joint 64 in a state in which the valves 62 and 63 are closed. When the second filler communication unit 61 is separated at the joint 64, the liquid containing unit 4 can be ready to be removed from the main body of the liquid ejection device 1. The valve 62 may be closed when the liquid ejection device 1 on which the liquid containing unit 4 is mounted is moved.

Regarding a cut surface intersecting with (for example, perpendicular to) the liquid ejection direction of the head 3, the cross-sectional area of the auxiliary container 60 is smaller than the maximum value of the cross-sectional area in the housing 7. It is only necessary that the auxiliary container 60 have such a dimension as to be able to control the pressure of gas. Needless to say, in FIG. 18, the dimension of the auxiliary container 60 in a drawing depth direction may be reduced.

It is only necessary that the gas communication unit 55 be configured so as to pass gas therethrough. The inner diameter of the gas communication unit 55 may be smaller than that of the first and second filler communication units 47 and 61.

The liquid level position control mechanism 42 includes the storage tank 44, the liquid feeding unit 45, and the liquid level position sensor 46. The liquid level position sensor 46 detects the position of the liquid level of the liquid filler 11 in the auxiliary container 60. The liquid feeding unit 45 operates based on the position of the liquid level of the liquid filler 11 in the auxiliary container 60 measured with the liquid level position sensor 46.

When the liquid feeding unit 45 operates, the liquid filler 11 is fed from the storage tank 44 to the auxiliary container 60, and the position of the liquid level of the liquid filler 11 in the auxiliary container 60 is raised. As a result, the liquid level of the liquid filler 11 in the auxiliary container 60 is kept at a predetermined position.

The gas pressure control mechanism 43 includes the regulator 52, the pump 53, and the pressure sensor 54. The pressure sensor 54 is provided in the gas communication unit 55. The pressure sensor 54 measures a relative pressure in the gas communication unit 55 with respect to the atmospheric pressure in the liquid ejection device 1.

Upon the activation of the liquid ejection device 1, the gas pressure control mechanism 43 starts pressure control. The control unit (not shown) controls the regulator 52 and the pump 53 to control the pressure of the gas in the gas communication unit 55 based on an electric signal corresponding to the pressure measured with the pressure sensor 54.

The gas communication unit 55 communicates with the auxiliary container 60, and the pressure of the gas in the auxiliary container 60 is controlled by controlling the pressure of the gas in the gas communication unit 55. Then, the pressure of the liquid filler 11 in the auxiliary container 60 and the housing 7 is controlled by controlling the pressure of the gas in the auxiliary container 60. When the pressure of the liquid filler 11 is controlled, the pressure in the containing bag 8 is controlled, and the pressure in the head 3 is controlled within a predetermined range.

It is desired that the pressure sensor 54 be disposed at a position closer to the gas-liquid separation film 59 so as not to be influenced easily by the external disturbance.

When the liquid 9 is ejected from the orifice 10 of the head 3, the liquid 9 in the flexible containing bag 8 is consumed, and the capacity of the flexible containing bag 8 contracts. As a result, the liquid filler 11 flows from the auxiliary container 60 into the housing 7, and the liquid level position of the auxiliary container 60 falls.

When the liquid level position sensor 46 detects that the liquid level position of the auxiliary container 60 has fallen below a predetermined position, the control unit (not shown) drives the liquid feeding unit 45. As a result, the liquid filler 11 is fed from the storage tank 44 to the auxiliary container 60 via the first filler communication unit 47.

The first filler communication unit 47 may be provided with a valve, and in this case, the control unit (not shown) drives the liquid feeding unit 45 after opening the valve.

When the liquid filler 11 is fed from the storage tank 44 to the auxiliary container 60, the liquid level position of the auxiliary container 60 is raised. When the liquid level position sensor 46 detects that the liquid level position has fallen within a predetermined range, the control unit (not shown) stops the liquid feeding unit 45.

Thus, the operation of the liquid level position control mechanism 42 controls the liquid level position of the auxiliary container 60 within the predetermined range.

The gas-liquid separation film 59 is formed between the auxiliary container 60 and the gas communication unit 55. The gas-liquid separation film 59 passes gas therethrough but not a liquid.

In the case where the liquid level position control mechanism 42 goes out of order, the liquid filler 11 may be fed excessively from the storage tank 44 into the auxiliary container 60 via the filler communication unit 47 in some cases. In this case, the liquid filler 11 in the auxiliary container 60 is brought into contact with the gas-liquid separation film 59. The gas-liquid separation film 59 does not pass liquid therethrough, and hence the flow of the liquid filler 11 to the gas communication unit 55 is suppressed.

The case where the liquid containing unit 4 is removed from the main body of the liquid ejection device 1 and conveyed is assumed.

In this case, the density in the housing 7 is substantially uniform, and hence the vibration of the flexible containing bag 8 is suppressed. Thus, the variation in negative pressure applied to the head 3 can be suppressed, and the running of the liquid 9 from the orifice 10 of the head 3 can be suppressed.

Further, the state in which the liquid containing unit 4 is mounted on the main body of the liquid ejection device 1 is assumed. In this state, an external force is applied to the gas communication unit 55 and the filler communication unit 47, and the liquid containing unit 4 vibrates in some cases.

Even when an external force is applied to the gas communication unit 55 or the filler communication unit 47 to cause vibration in the liquid containing unit 4, the vibration of the flexible containing bag 8 is suppressed because the density in the housing 7 is substantially uniform. Thus, the variation in negative pressure applied to the head 3 is suppressed.

Further, although gas is present in the auxiliary container 60 and the gas communication unit 55, the density of the gas is smaller than that of a liquid. The density of the gas is sufficiently small, and hence the gas in the gas communication unit 55 is sufficiently light. Thus, even when acceleration is applied to the gas in the gas communication unit 55 due to the vibration of the gas communication unit 55, a force applied from the gas to the liquid filler 11 of the auxiliary container 60 is small. Therefore, the liquid filler 11 hardly vibrates, and the variation in negative pressure is suppressed.

In addition, the gas has compressibility. The gas in the auxiliary container 60 and the gas communication unit 55 serves as a buffer by contracting or expanding to suppress the vibration of the liquid filler 11. As a result, the vibration of the containing bag 8 is suppressed, and the ejection stability when the liquid 9 is ejected from the orifice 10 can be ensured.

Even when the liquid containing unit 4 moves in the liquid ejection device 1 in the case where the liquid containing unit 4 is mounted on the main body of the liquid ejection device 1, the vibration of the flexible containing bag 8 can be suppressed because the density in the housing 7 is substantially uniform. Thus, the variation in negative pressure applied to the head 3 can be suppressed, and the running of the liquid 9 from the orifice 10 of the head 3 can be suppressed.

The remaining configuration is the same as that of the first embodiment, and hence the descriptions thereof are omitted. The liquid ejection device 1 according to this embodiment also exhibits the effects similar to those of the first embodiment.

(Thirteenth Embodiment)

Figure 19:
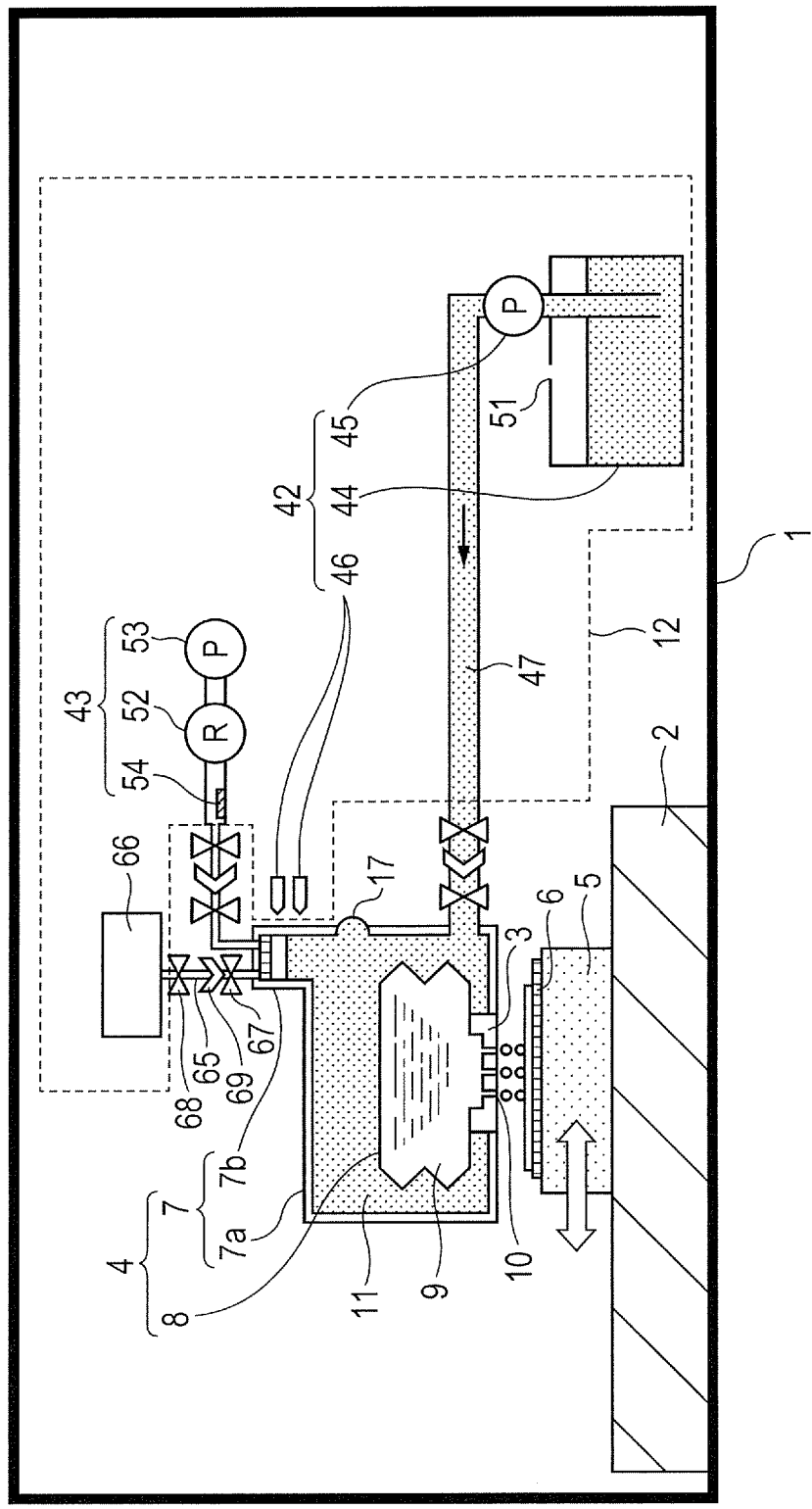
FIG. 19 is a schematic view of a liquid ejection device according to a thirteenth embodiment of the present invention.

A thirteenth embodiment of the present invention is described with reference to FIG. 19. FIG. 19 is a schematic view of a liquid ejection device according to this embodiment. Note that, the same elements as those in the first to eleventh embodiments are denoted by the same reference symbols, and the descriptions thereof are omitted.

As illustrated in FIG. 19, the pressure adjusting unit 12 includes the gas pressure control mechanism 43. The gas pressure control mechanism 43 according to this embodiment is disposed closer to the liquid containing unit 4, compared to the gas pressure control mechanism 43 according to the eleventh embodiment (see FIG. 17).

Further, the pressure adjusting unit 12 includes a gas buffer portion 66 connected to the projecting portion 7b through a second gas communication unit 65.

The second gas communication unit 65 is provided with valves 67 and 68 and a joint 69, and the second gas communication unit 65 can be separated at the joint 69 in a state in which the valves 67 and 68 are closed. When the second gas communication unit 65 is separated at the joint 69, the liquid containing unit 4 can be ready to be removed from the main body of the liquid ejection device 1.

The other constituent elements are the same as those of the eleventh embodiment (see FIG. 17), and hence the descriptions thereof are omitted here. The liquid ejection device 1 according to this embodiment also exhibits the same effects as those of the first and eleventh embodiments.

The gas in the gas buffer portion 66 serves as a buffer. Therefore, even when an external force is applied to the first gas communication unit 55 (see FIG. 17, etc.) and the filler communication unit 47 to cause vibration in the liquid containing unit 4, the vibration of the liquid filler 11 is suppressed. As a result, the variation in negative pressure applied to the orifice 10 of the head 3 can be suppressed, and the ejection stability when the liquid 9 is ejected from the orifice 10 can be ensured.

Even when the liquid containing unit 4 moves in the main body of the liquid ejection device 1, the gas in the gas buffer portion 66 serves as a buffer, and hence the vibration of the liquid filler 11 is suppressed. Thus, the vibration of the flexible containing bag 8 is suppressed, and the variation in negative pressure applied to the head 3 can be suppressed, with the result that the running of the liquid 9 from the orifice 10 of the head 3 can be suppressed.

(Fourteenth Embodiment)

Figure 20:
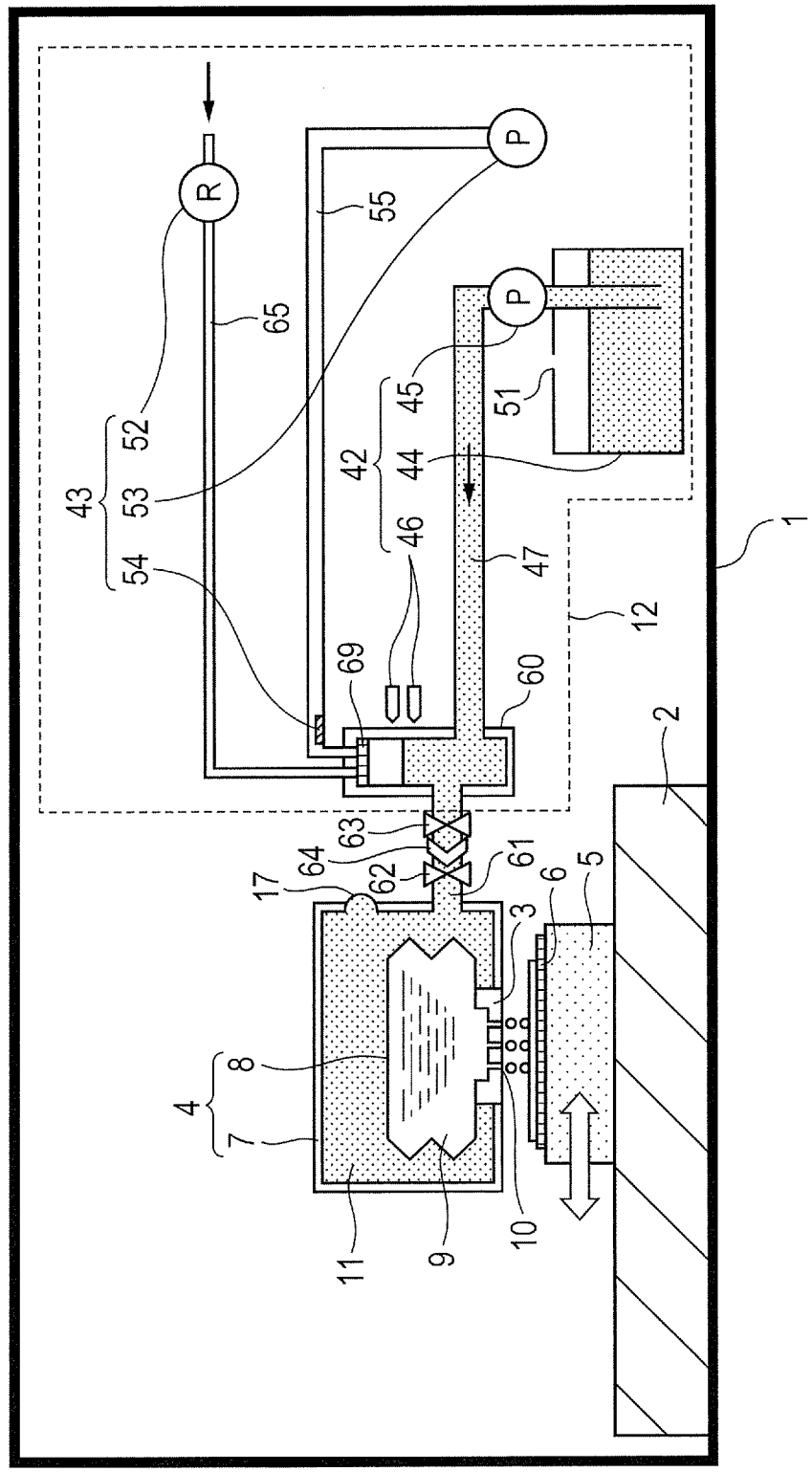
FIG. 20 is a schematic view of a liquid ejection device according to a fourteenth embodiment of the present invention.

A fourteenth embodiment of the present invention is described with reference to FIG. 20. FIG. 20 is a schematic view of a liquid ejection device according to this embodiment. Note that, the same elements as those in the first to twelfth embodiments are denoted by the same reference symbols, and the descriptions thereof are omitted.

In this embodiment, aqueous ink is used as the liquid filler 11.

As illustrated in FIG. 20, the pump 53 communicates with the auxiliary container 60 via the first gas communication unit 55. The second gas communication unit 65 enables the communication between a gas supply portion (not shown) and the auxiliary container 60, and the regulator 52 is provided along the way of the second gas communication unit 65.

The second gas communication unit 65 is supplied with gas not containing oxygen, for example, nitrogen. The gas supplied to the auxiliary container 60 via the second gas communication unit 65 is fed to the pump 53 via the first gas communication unit 55 and discharged from the pump 53.

It has been known that oxygen is easily dissolved in water, compared to the gasses other than oxygen. Therefore, when aqueous ink is exposed to the gas containing a relatively great amount of oxygen in the auxiliary container 60, oxygen is dissolved in the aqueous ink, and air bubbles may be generated in the housing 7.

In this embodiment, the auxiliary container 60 is supplied with gas not containing oxygen, for example, nitrogen so that the concentration of oxygen in the auxiliary container 60 decreases. As a result, the gas in the auxiliary container 60 becomes less dissolved in the liquid filler 11, and the amount of gas dissolved in the liquid filler 11 is reduced.

When the amount of gas dissolved in the liquid filler 11 is reduced, air bubbles are less generated in the auxiliary container 60 and the housing 7, and the state in which the housing 7 is filled with the liquid filler 11 is maintained. Thus, the density in the housing 7 can be maintained substantially uniformly, and the vibration of the containing bag 8 can be suppressed and the variation in negative pressure in the head 3 can be suppressed. As a result, the leakage of the liquid 9 from the orifice 10 is suppressed.

The remaining configuration is the same as that of the twelfth embodiment, and hence the descriptions thereof are omitted. The liquid ejection device 1 according to this embodiment also exhibits the effects similar to those of the twelfth embodiment.

(Fifteenth Embodiment)

Figure 21:
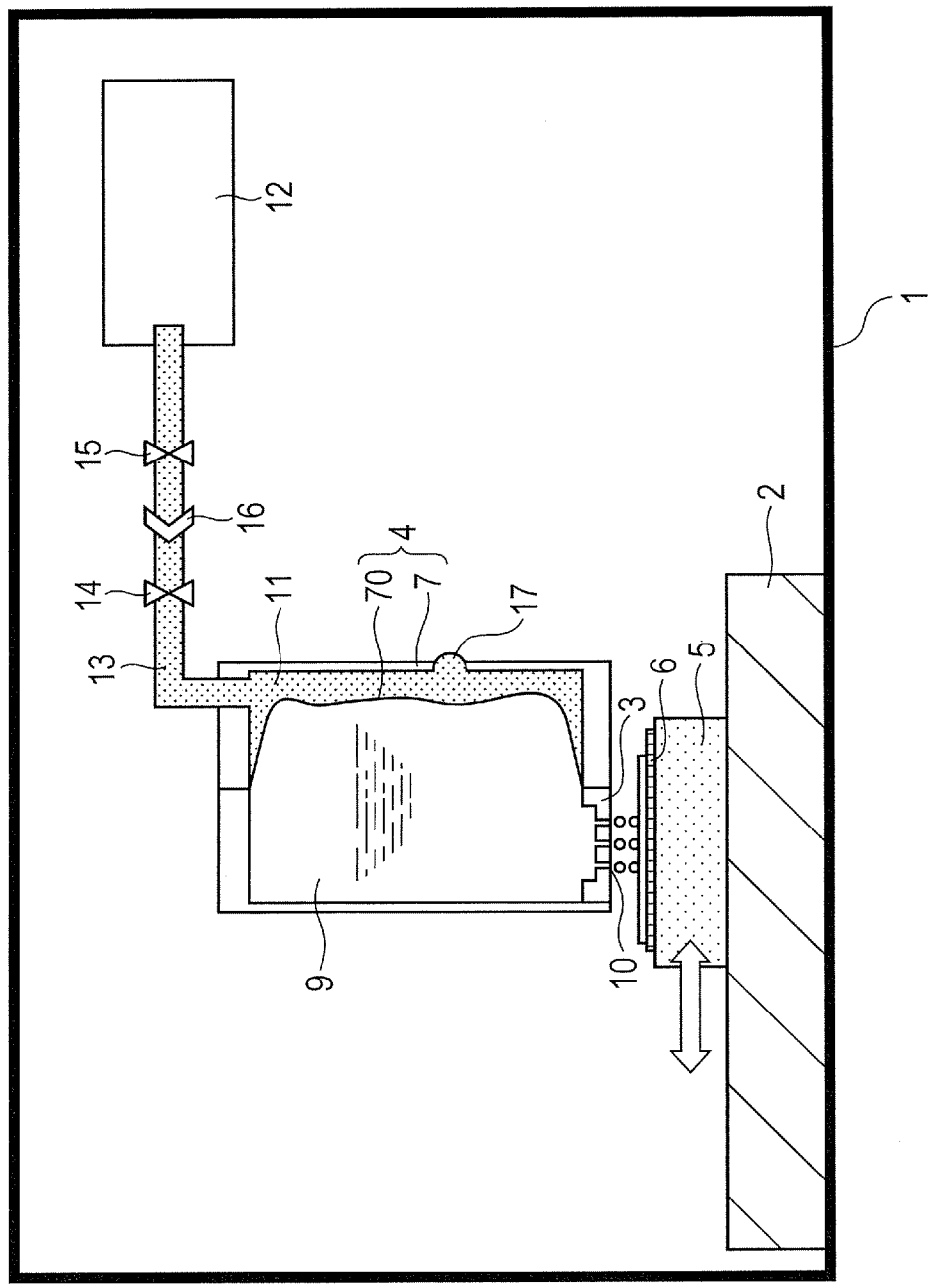
FIG. 21 is a schematic view of a liquid ejection device according to a fifteenth embodiment of the present invention.
Figure 22:
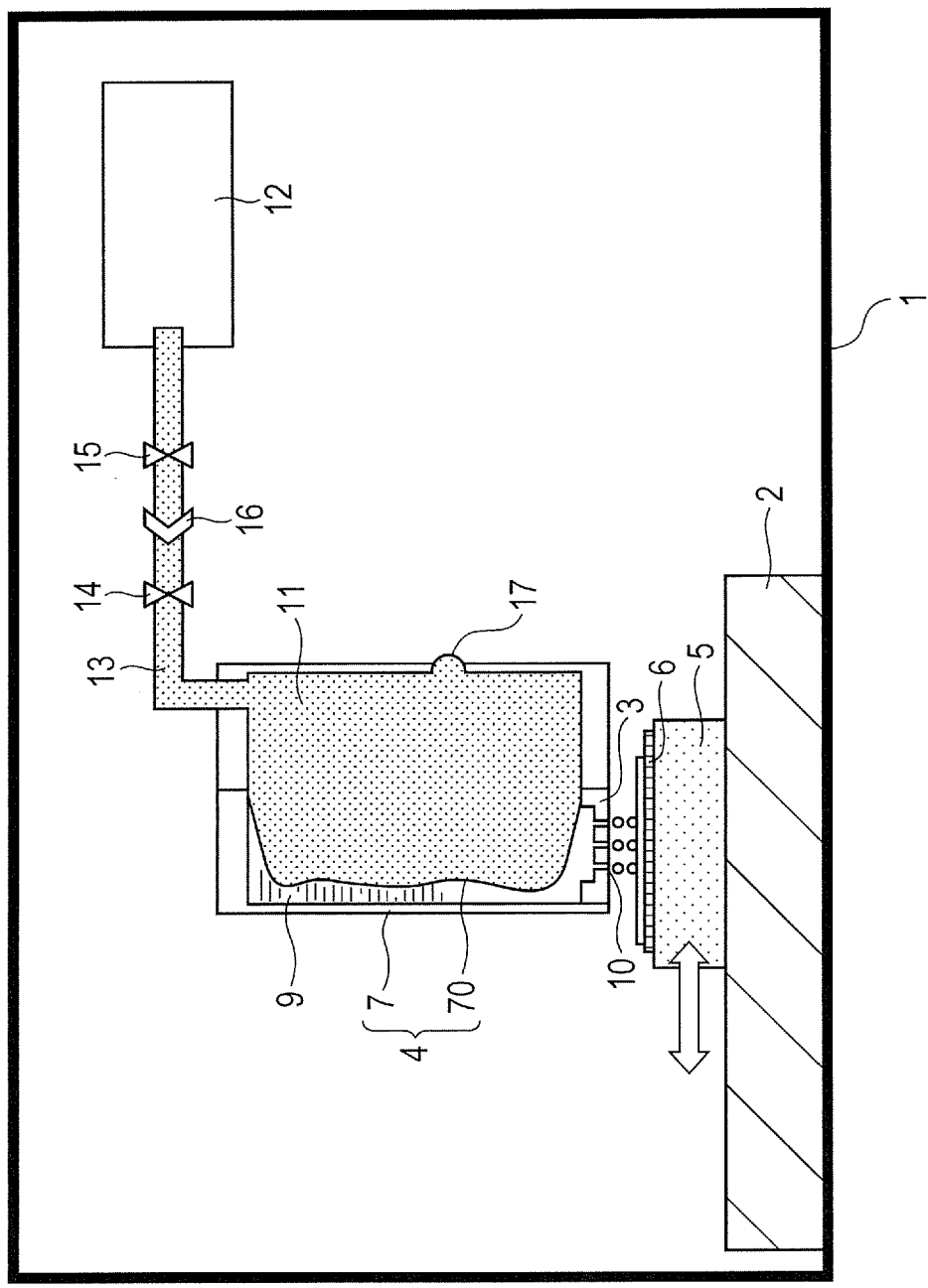
FIG. 22 is a schematic view of a state in which a liquid has been consumed from the state illustrated in FIG. 21.

A fifteenth embodiment of the present invention is described with reference to FIGS. 21 and 22. FIG. 21 is a schematic view of a liquid ejection device 1 according to this embodiment, and FIG. 22 is a schematic view of the state in which the liquid 9 has been consumed from the state illustrated in FIG. 21. Note that, the same elements as those in the first embodiment are denoted by the same reference symbols, and the descriptions thereof are omitted.

As illustrated in FIG. 21, the liquid ejection device 1 according to this embodiment includes a flexible film 70 in place of the flexible containing bag 8 (see FIG. 1, etc.). The flexible film 70 does not have a bellows.

The flexible film 70 partitions the inner space of the housing 7 into a first containing space communicating with the orifice 10 of the head 3 and a second containing space not communicating with the orifice 10 of the head 3. The liquid 9 is contained in the first containing space, and the liquid 9 is ejected from the orifice 10. The second containing space communicates with the pressure adjusting unit 12, and the liquid filler 11 is filled into the second containing space.

As illustrated in FIG. 22, the flexible film 70 is deformed along with the consumption of the liquid 9, and the second containing space is enlarged along with the contraction of the first containing space. The pressure in the housing 7 is kept at a predetermined value by adjusting the pressure of the liquid filler 11 in the second containing space through use of the pressure adjusting unit 12. As a result, the pressure applied to the head 3 is maintained, and the leakage of the liquid 9 from the orifice 10 is suppressed.

Through use of the flexible film 70 not having a bellows, the structure of the liquid containing unit 4 can be simplified, and the production cost of the liquid containing unit 4 can be reduced.

The remaining configuration is the same as that of the first embodiment, and hence the descriptions thereof are omitted. The liquid ejection device 1 according to this embodiment also exhibits the effects similar to those of the first embodiment.

(Sixteenth Embodiment)

A sixteenth embodiment of the present invention is described with reference to FIG. 23. Note that, this embodiment has a configuration common to that of the fifteenth embodiment, and the descriptions of the common portions are partially omitted. The difference is hereinafter described in detail.

Figure 23:
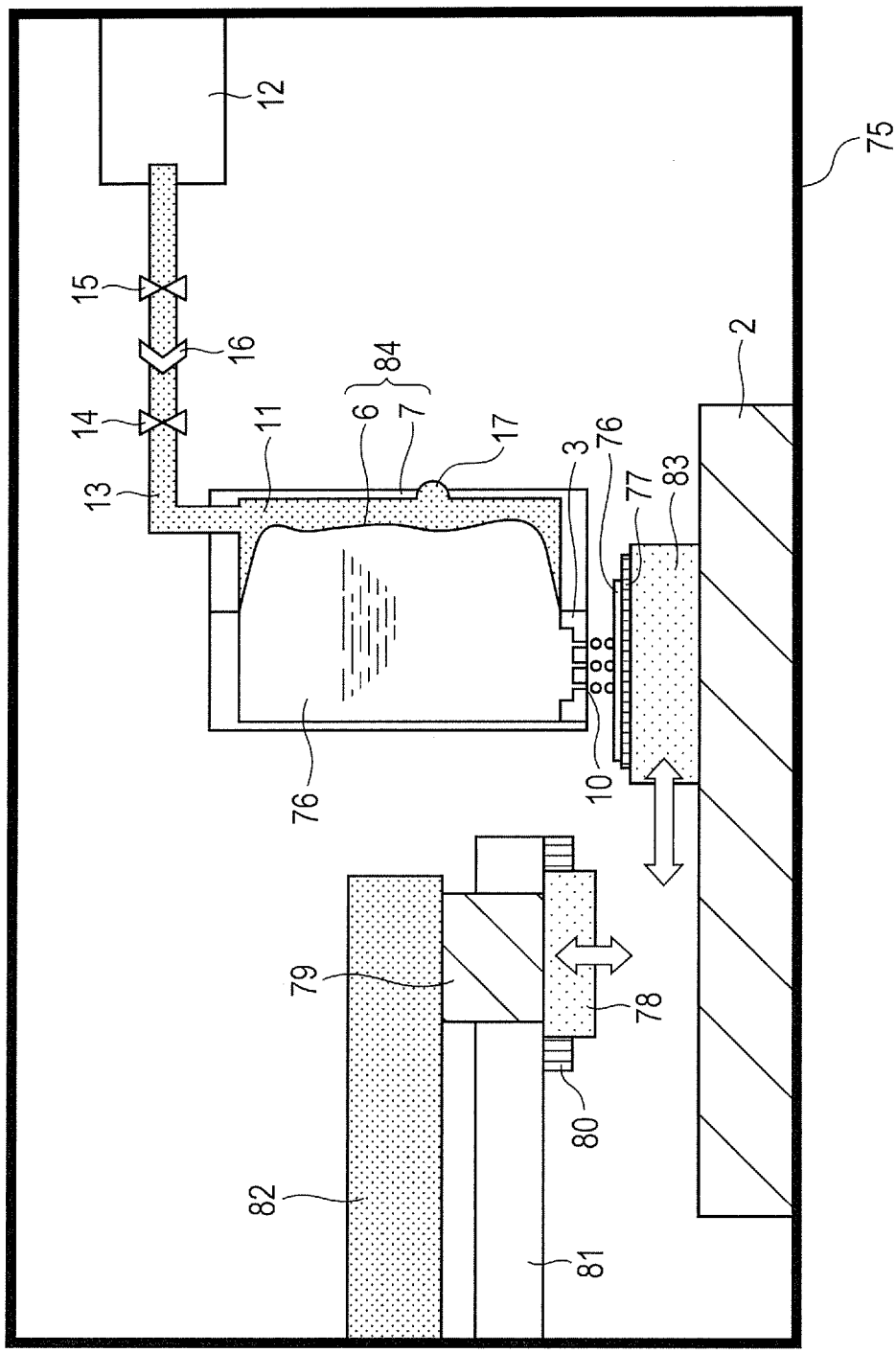
FIG. 23 is a schematic view of a liquid ejection device according to a sixteenth embodiment of the present invention.

As illustrated in FIG. 23, an imprint device 75 of the present invention mainly includes the liquid ejection device 1. In addition, the liquid ejection device 1 mainly includes the head 3, a resist containing unit 84, and the pressure adjusting unit 12.

A first containing space of the resist containing unit 84 contains a light-curable resist 76. The head 3 communicating with the first containing space ejects the resist 76 onto the surface of a wafer 77 (substrate) described later.

Note that, in this embodiment, the light-curable resist 76 is formed of a light-curable resin. However, the light-curable resist 76 may be formed of another light-curable substance (fluid).

Further, the imprint device 75 of this embodiment includes a mold 78 having one surface on which a groove-shaped fine pattern (unevenness pattern) is formed, a mold moving portion 80 for moving the mold 78, and a mold support portion 81 for supporting the mold 78 through the intermediation of the mold moving portion 80. The mold 78 is formed of a quartz material having light transmittance and is configured so as to be moved in a vertical direction by the mold moving portion 80. Note that, the mold moving portion 80 and the mold support portion 81 serve as a pattern forming unit of the present invention.

In the imprint device 75 according to this embodiment, an exposure unit 79 (light irradiating unit) for irradiating the resist 76 (pattern) ejected onto the wafer 77 (substrate) with ultraviolet light is provided with the intermediation of the mold 78. The exposure unit 79 is supported above the mold 78 by an exposure unit support portion 82.

A step of forming a pattern on the surface of the wafer 77 through use of the imprint device 75 according to this embodiment is hereinafter described.

First, the resist 76 ejected from the head 3 onto the wafer 77 is applied onto the wafer 77 to form a predetermined pattern.

The wafer 77 having the resist 76 (pattern) applied thereto (formed thereon) is moved to a region below the mold 78 by a wafer conveyance portion 83 (moving unit).

Then, the mold 78 is lowered by the mold moving portion 80, and the mold 78 is pressed against the resist 76 (pattern) formed on the upper surface of the wafer 77. Owing to this pressing operation, the resist 76 is filled into the fine pattern (groove) of the mold 78.

The resist 76 is irradiated with ultraviolet light by the exposure unit 79 through the mold 78 after the filling of the resist 76 into the fine pattern. In this way, a pattern formed of the resist 76 is formed.

The mold 78 is raised by the mold moving portion 80 after the formation of the pattern, and the mold 78 is removed from the formed pattern. Accordingly, the step of forming a pattern on the wafer substrate by the imprint device 75 is ended.

The negative pressure in the head 3 of the imprint device 75 is controlled (maintained) by the pressure adjusting unit 12 through the resist 76 in the first containing space and the liquid filler 11 in the second containing space. This can suppress the variation in pressure in the large-capacity resist containing unit 84. As a result, the running of the resist 76 from the orifice 10 of the head 3 can be suppressed in the imprint device 75.

Note that, the configuration of the liquid ejection device according to each embodiment described above can be appropriately applied to the imprint device 75 according to this embodiment.

Further, the imprint device 75 of the present invention can be applied to, for example, a semiconductor producing device for producing a device such as a semiconductor integrated circuit element or a liquid crystal display element.

A method of producing a component through use of the imprint device 75 of the present invention can include a pattern forming step of forming a pattern on a substrate (wafer, glass plate, film-like substrate) through use of the imprint device 75 and a treatment step of treating the substrate having the pattern formed thereon.

Further, as the treatment step of treating a substrate, there is given etching treatment of etching a substrate.

Note that, in the case of producing a device (component) such as a patterned medium (recording medium) or an optical element, processing treatment other than the etching treatment is preferred.

According to the method of producing a component of the present invention, the performance, quality, and productivity of the component are enhanced, and the production cost can be reduced, compared to a related-art component production method.

As is understood from each embodiment described above, in the present invention, the second containing space is filled with the liquid filler. The volume of the liquid filler is less influenced by a change in temperature and pressure, compared to the volume of gas. Therefore, even when the temperature or atmospheric pressure on the periphery of the liquid ejection device changes, the volume of the liquid filler is not likely to vary, and the variation in pressure of the liquid contained in the first containing space is suppressed.

Further, the liquid filler is filled into the second containing space, and hence the flexible member is hardly exposed to the gas. Therefore, the gas hardly enters the first containing space, and the increase in pressure of the liquid contained in the first containing space is suppressed.

Further, the first containing space is filled with the liquid and the second containing space is filled with the liquid filler, and the difference in density between the liquid and the liquid filler is relatively small. Therefore, the flexible member is hardly rocked and the pressure of the liquid contained in the first containing space hardly varies even when an impact is applied to the housing.

Further, the pressure of the liquid contained in the first containing space is adjusted by adjusting the pressure of the liquid filler filled into the second containing space, and hence it is not necessary that the float be sunk in the liquid filler. Therefore, compared to the case where the float is provided in the housing, in the present invention, the rocking of the flexible member when an impact is applied to the containing portion is suppressed, and the pressure of the liquid contained in the first containing space is not likely to vary.

As described above, the pressure of the liquid contained in the first containing space is not likely to vary, and hence the internal pressure of the head is maintained to be a negative pressure, and the leakage of the liquid from the head is suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-208957, filed Oct. 4, 2013 and Japanese Patent Application No. 2014-188444, filed Sep. 17, 2014 which are hereby incorporated by reference herein in their entirety.

What is claimed is:

1. A liquid ejection device comprising:
a head configured to eject a liquid;
a liquid containing unit having a sealed housing and a flexible member provided in the sealed housing, the sealed housing including a first containing space communicating with the head and a second containing space partitioned from the first containing space by the flexible member, the first containing space containing the liquid, the volume of the first containing space decreasing along with the ejection of the liquid from the head, the second containing space containing a liquid filler;
a pressure adjusting unit configured to communicate with the second containing space and adjust a pressure of the liquid filler in the second containing space so as to maintain a negative pressure with respect to the head;
a communication unit configured to allow communication between the second containing space and the pressure adjusting unit; and
a valve provided in the communication unit,
wherein the liquid containing unit is separable from the pressure adjusting unit between the pressure adjusting unit and the valve.

2. The liquid ejection device according to claim 1, wherein the pressure adjusting unit comprises:
a storage tank configured to store the liquid filler, the storage tank communicating with the second containing space;
a pressure measuring unit configured to measure a pressure of the liquid filler in the second containing space;
a liquid feeding unit configured to transport the liquid filler between the second containing space and the storage tank; and
a control unit configured to control an operation of the liquid feeding unit based on the pressure measured with the pressure measuring unit.

3. The liquid ejection device according to claim 1,
wherein the sealed housing comprises a main portion including the first containing space and the second containing space, and a hollow projecting portion communicating with the second containing space and containing the liquid filler and gas, wherein the hollow projecting portion projects from the main portion in a direction opposite to a liquid ejection direction of the head, wherein the pressure adjusting unit comprises a liquid level position control mechanism configured to control a position of a liquid level of the liquid filler in the hollow projecting portion and a gas pressure control mechanism configured to control a pressure of the gas in the hollow projecting portion, and wherein a cross-section of an inside of the hollow projecting portion is smaller than a maximum value of a cross-section of an inside of the main portion regarding a cut surface intersecting with a projection direction of the hollow projecting portion.

4. The liquid ejection device according to claim 3, wherein the following expression is satisfied:

$$L < g/(2\pi f^2),$$

where L represents a maximum dimension of the inside of the hollow projecting portion in the cut surface intersecting with the projection direction, f represents a frequency of vibration applied to the liquid containing unit when the liquid containing unit is conveyed, g represents a gravitational acceleration.

5. The liquid ejection device according to claim 3, wherein the liquid level position control mechanism communicates with the sealed housing so as to be separable therefrom, and the gas pressure control mechanism communicates with the hollow projecting portion so as to be separable therefrom.

6. The liquid ejection device according to claim 3, wherein the pressure adjusting unit comprises a gas buffer portion communicating with the hollow projecting portion.

7. The liquid ejection device according to claim 6, wherein the gas buffer portion is separable from the hollow projecting portion.

8. The liquid ejection device according to claim 3, wherein the gas pressure control mechanism communicates with a part of the hollow projecting portion containing the gas via a gas-liquid separation film.

9. The liquid ejection device according to claim 1, wherein the pressure adjusting unit comprises:
 an auxiliary container configured to contain the liquid filler and gas, the auxiliary container communicating with the second containing space;
 a liquid level position control mechanism configured to control a position of a liquid level of the liquid filler in the auxiliary container; and
 a gas pressure control mechanism configured to control a pressure of the gas in the auxiliary container.

10. The liquid ejection device according to claim 9, wherein the auxiliary container is separable from the sealed housing.

11. The liquid ejection device according to claim 9, wherein the gas is free from oxygen.

12. The liquid ejection device according to claim 1, further comprising:
 a pressurizing unit configured to apply a pressure to the liquid filler in the second containing space; and
 a flow limiting unit configured to limit a flow of the liquid filler between the pressure adjusting unit and the second containing space.

13. The liquid ejection device according to claim 12, wherein the pressurizing unit comprises a positive displacement pump.

14. The liquid ejection device according to claim 1, wherein the head is fixed to the liquid containing unit.

15. The liquid ejection device according to claim 1, wherein the liquid filler has a density falling within a range of from 80% or more to 120% or less with respect to a density of the liquid.

16. The liquid ejection device according to claim 1, wherein the volume of the second containing space increases along with the ejection of the liquid from the head.

17. The liquid ejection device according to claim 1, wherein the liquid filler is an incompressible substance.

18. The liquid ejection device according to claim 17, wherein the incompressible substance comprises water or a gel-like substance.

19. The liquid ejection device according to claim 1, wherein the flexible member has a thickness of from 10 μm to 200 μm.

20. The liquid ejection device according to claim 1, wherein a volume of the flexible member is less than 1% with respect to the total volume of the liquid filler and the liquid.

21. The liquid ejection device according to claim 1, further comprising a pressure sensor which is provided in the communication unit and which measures a pressure of the liquid filler.

22. The liquid ejection device according to claim 21, wherein
 the first containing space is filled with the liquid,
 the second containing space is filled with the liquid filler, and
 a pressure inside the head is detected by the pressure sensor.

23. The liquid ejection device according to claim 1, further comprising a storage tank for storing the liquid filler, the storage tank communicating with the second containing space.

24. The liquid ejection device according to claim 1, wherein
 in the communication unit, another valve is provided between the valve and the pressure adjusting unit, and
 a joint portion is provided between the valve and the other valve, the joint portion being capable of separating a side of the liquid containing unit and a side of the pressure adjusting unit.

25. The liquid ejection device according to claim 1, wherein
 the flexible member comprises a flexible film, and
 the flexible film partitions an inner space of the sealed housing by connecting an upper surface, a bottom surface and side surfaces between the upper surface and the bottom surface of the sealed housing.

26. A liquid leakage suppression method for a liquid ejection device including a head configured to eject a liquid, a sealed housing, and a flexible member provided in the sealed housing, the sealed housing including a first containing space communicating with the head and a second containing space partitioned from the first containing space by the flexible member, the liquid being contained in the first containing space,
 the liquid leakage suppression method comprising:
 filling a liquid filler into the second containing space; and
 adjusting a pressure of the liquid filler in the second containing space so as to maintain a negative pressure with respect to the head,
 wherein the adjusting comprises adjusting a pressure of the liquid filler by a pressure adjusting unit communicating with the second containing space, and
 wherein the liquid leakage suppression method further comprises pressurizing the liquid filler in the second containing space while limiting a flow of the liquid filler between the pressure adjusting unit and the second containing space.

27. The liquid leakage suppression method according to claim 26, wherein the pressurizing comprises pressurizing the liquid filler by a positive displacement pump.

28. An imprint device, comprising:
a liquid ejection device comprising:
   a head configured to eject a liquid;
   a liquid containing unit having a sealed housing and a flexible member provided in the sealed housing, the sealed housing including a first containing space communicating with the head and a second containing space partitioned from the first containing space by the flexible member, the first containing space containing the liquid, the volume of the first containing space decreasing along with the ejection of the liquid from the head, the second containing space containing a liquid filler;
   a pressure adjusting unit configured to communicate with the second containing space and adjust a pressure of the liquid filler in the second containing space so as to maintain a negative pressure with respect to the head;
   a communication unit configured to allow communication between the second containing space and the pressure adjusting unit; and
   a valve provided in the communication unit, wherein the liquid containing unit is separable from the pressure adjusting unit between the pressure adjusting unit and the valve;
a moving unit configured to cause relative movement between the liquid ejection device and a substrate having a surface to which the liquid ejected from the head is to be applied;
a mold having a surface on which an unevenness pattern is formed; and
a pattern forming unit configured to bring the surface of the mold having the unevenness pattern formed thereon into contact with the surface of the substrate applied with the liquid, thereby forming a pattern corresponding to the unevenness pattern formed on the surface of the mold on the surface of the substrate applied with the liquid.

29. The imprint device according to claim 28,
wherein the liquid comprises a light-curable liquid, and
wherein the pattern forming unit comprises a light irradiating unit configured to irradiate the pattern formed on the substrate with light to cure the pattern.

30. A method of producing a component including a substrate by using the imprint device according to claim 28, comprising:
forming a pattern on a surface of the substrate; and
treating the substrate having the pattern formed thereon.

31. A liquid ejection device comprising:
a head configured to eject a liquid;
a liquid containing unit having a sealed housing and a flexible member provided in the sealed housing, the sealed housing including a first containing space communicating with the head and a second containing space partitioned from the first containing space by the flexible member, the first containing space containing the liquid, the second containing space containing a liquid filler; and
a pressure adjusting unit comprising:
   a storage tank configured to store the liquid filler, the storage tank communicating with the second containing space;
   a pressure measuring unit configured to measure a pressure of the liquid filler in the second containing space;
   a liquid feeding unit configured to transport the liquid filler between the second containing space and the storage tank; and
   a control unit configured to control an operation of the liquid feeding unit based on the pressure measured with the pressure measuring unit,
wherein the pressure adjusting unit is configured to communicate with the second containing space and adjust a pressure of the liquid filler in the second containing space so as to maintain a negative pressure with respect to the head.

32. The liquid ejection device according to claim 31, further comprising:
a pressurizing unit configured to apply a pressure to the liquid filler in the second containing space; and
a flow limiting unit configured to limit a flow of the liquid filler between the pressure adjusting unit and the second containing space.

33. The liquid ejection device according to claim 32, wherein the pressurizing unit comprises a positive displacement pump.

34. The liquid ejection device according to claim 31, wherein the head is fixed to the liquid containing unit.

35. The liquid ejection device according to claim 31, wherein the liquid filler has a density falling within a range of from 80% or more to 120% or less with respect to a density of the liquid.

36. An imprint device, comprising:
a liquid ejection device comprising:
   a head configured to eject a liquid;
   a liquid containing unit having a sealed housing and a flexible member provided in the sealed housing, the sealed housing including a first containing space communicating with the head and a second containing space partitioned from the first containing space by the flexible member, the first containing space containing the liquid, the second containing space containing a liquid filler;
   a pressure adjusting unit comprising:
      a storage tank configured to store the liquid filler, the storage tank communicating with the second containing space;
      a pressure measuring unit configured to measure a pressure of the liquid filler in the second containing space;
      a liquid feeding unit configured to transport the liquid filler between the second containing space and the storage tank; and
      a control unit configured to control an operation of the liquid feeding unit based on the pressure measured with the pressure measuring unit,
a moving unit configured to cause relative movement between the liquid ejection device and a substrate having a surface to which the liquid ejected from the head is to be applied;
a mold having a surface on which an unevenness pattern is formed; and
a pattern forming unit configured to bring the surface of the mold having the unevenness pattern formed thereon into contact with the surface of the substrate applied with the liquid, thereby forming a pattern corresponding to the unevenness pattern formed on the surface of the mold on the surface of the substrate applied with the liquid,
wherein the pressure adjusting unit is configured to communicate with the second containing space and adjust a pressure of the liquid filler in the second containing space so as to maintain a negative pressure with respect to the head.

37. The imprint device according to claim 36,
wherein the liquid comprises a light-curable liquid, and
wherein the pattern forming unit comprises a light irradiating unit configured to irradiate the pattern formed on the substrate with light to cure the pattern.

38. A method of producing a component including a substrate by using the imprint device according to claim 36, comprising:
forming a pattern on a surface of the substrate; and
treating the substrate having the pattern formed thereon.

39. A liquid ejection device comprising:
a head configured to eject a liquid;
a liquid containing unit having a sealed housing and a flexible member provided in the sealed housing, the sealed housing including a first containing space communicating with the head and a second containing space partitioned from the first containing space by the flexible member, the first containing space containing the liquid, the second containing space containing a liquid filler;
a pressure adjusting unit configured to communicate with the second containing space and adjust a pressure of the liquid filler in the second containing space so as to maintain a negative pressure with respect to the head;
a pressurizing unit configured to apply a pressure to the liquid filler in the second containing space; and
a flow limiting unit configured to limit a flow of the liquid filler between the pressure adjusting unit and the second containing space.

40. The liquid ejection device according to claim 39, wherein the pressurizing unit comprises a positive displacement pump.

41. The liquid ejection device according to claim 39, wherein the head is fixed to the liquid containing unit.

42. The liquid ejection device according to claim 39, wherein the liquid filler has a density falling within a range of from 80% or more to 120% or less with respect to a density of the liquid.

43. An imprint device, comprising:
a liquid ejection device comprising:
a head configured to eject a liquid;
a liquid containing unit having a sealed housing and a flexible member provided in the sealed housing, the sealed housing including a first containing space communicating with the head and a second containing space partitioned from the first containing space by the flexible member, the first containing space containing the liquid, the second containing space containing a liquid filler;
a pressure adjusting unit configured to communicate with the second containing space and adjust a pressure of the liquid filler in the second containing space so as to maintain a negative pressure with respect to the head;
a pressurizing unit configured to apply a pressure to the liquid filler in the second containing space; and
a flow limiting unit configured to limit a flow of the liquid filler between the pressure adjusting unit and the second containing space;
a moving unit configured to cause relative movement between the liquid ejection device and a substrate having a surface to which the liquid ejected from the head is to be applied;
a mold having a surface on which an unevenness pattern is formed; and
a pattern forming unit configured to bring the surface of the mold having the unevenness pattern formed thereon into contact with the surface of the substrate applied with the liquid, thereby forming a pattern corresponding to the unevenness pattern formed on the surface of the mold on the surface of the substrate applied with the liquid.

44. The imprint device according to claim 43,
wherein the liquid comprises a light-curable liquid, and
wherein the pattern forming unit comprises a light irradiating unit configured to irradiate the pattern formed on the substrate with light to cure the pattern.

45. A method of producing a component including a substrate by using the imprint device according to claim 43, comprising:
forming a pattern on a surface of the substrate; and
treating the substrate having the pattern formed thereon.

46. A liquid ejection device comprising:
a head configured to eject a liquid;
a liquid containing unit having a sealed housing and a flexible member provided in the sealed housing, the sealed housing including a first containing space communicating with the head and a second containing space partitioned from the first containing space by the flexible member, the first containing space containing the liquid, the volume of the first containing space decreasing along with the ejection of the liquid from the head, the second containing space containing a liquid filler; and
a pressure adjusting unit configured to communicate with the second containing space and adjust a pressure of the liquid filler in the second containing space so as to maintain a negative pressure with respect to the head,
wherein the liquid filler has a density falling within a range of from 80% or more to 120% or less with respect to a density of the liquid.

47. The liquid ejection device according to claim 46, wherein the head is fixed to the liquid containing unit.

48. The liquid ejection device according to claim 46, wherein the volume of the second containing space increases along with the ejection of the liquid from the head.

49. The liquid ejection device according to claim 46, wherein the liquid filler is an incompressible substance.

50. The liquid ejection device according to claim 49, wherein the incompressible substance comprises water or a gel-like substance.

51. The liquid ejection device according to claim 46, wherein the flexible member has a thickness of from 10 μm to 200 μm.

52. The liquid ejection device according to claim 46, wherein a volume of the flexible member is less than 1% with respect to the total volume of the liquid filler and the liquid.

53. The liquid ejection device according to claim 46, further comprising a pressure sensor which measures a pressure of the liquid filler.

54. The liquid ejection device according to claim 53, wherein
the first containing space is filled with the liquid,
the second containing space is filled with the liquid filler, and
a pressure inside the head is detected by the pressure sensor.

55. The liquid ejection device according to claim 46, further comprising sing a storage tank for storing the liquid filler, the storage tank communicating with the second containing space.

56. The liquid ejection device according to claim 46, wherein in the communication unit, first and second valves are provided between the liquid containing unit and the pressure adjusting unit, and a joint portion is provided between the first valve and the second valve, the joint portion being capable of separating a side of the liquid containing unit and a side of the pressure adjusting unit.

57. The liquid ejection device according to claim 46, wherein the flexible member comprises a flexible film, and the flexible film partitions an inner space of the sealed housing by connecting an upper surface, a bottom surface and side surfaces between the upper surface and the bottom surface of the sealed housing.

58. An imprint device, comprising:

a liquid ejection device comprising:

a head configured to eject a liquid;

a liquid containing unit having a sealed housing and a flexible member provided in the sealed housing, the sealed housing including a first containing space communicating with the head and a second containing space partitioned from the first containing space by the flexible member, the first containing space containing the liquid, the volume of the first containing space decreases along with the ejection of the liquid from the head, the second containing space containing a liquid filler; and a pressure adjusting unit configured to communicate with the second containing space and adjust a pressure of the liquid filler in the second containing space so as to maintain a negative pressure with respect to the head;

a moving unit configured to cause relative movement between the liquid ejection device and a substrate having a surface to which the liquid ejected from the head is to be applied;

a mold having a surface on which an unevenness pattern is formed; and a pattern forming unit configured to bring the surface of the mold having the unevenness pattern formed thereon into contact with the surface of the substrate applied with the liquid, thereby forming a pattern corresponding to the unevenness pattern formed on the surface of the mold on the surface of the substrate applied with the liquid, wherein the liquid filler has a density falling within a range of from 80% or more to 120% or less with respect to a density of the liquid.

59. The imprint device according to claim 58, wherein the liquid comprises a light-curable liquid, and wherein the pattern forming unit comprises a light irradiating unit configured to irradiate the pattern formed on the substrate with light to cure the pattern.

60. A method of producing a component including a substrate by using the imprint device according to claim 58, comprising:

forming a pattern on a surface of the substrate; and treating the substrate having the pattern formed thereon.

* * * * *